(12) United States Patent
Fedorov et al.

(10) Patent No.: US 11,959,836 B2
(45) Date of Patent: Apr. 16, 2024

(54) ANALYSIS SYSTEM AND METHODS OF USE THEREOF

(71) Applicant: Georgia Tech Research Corporation, Atlanta, GA (US)

(72) Inventors: Andrei G. Fedorov, Atlanta, GA (US); Mason Chilmonczyk, Atlanta, GA (US); Peter Arthur Kottke, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 526 days.

(21) Appl. No.: 17/265,914

(22) PCT Filed: Aug. 15, 2019

(86) PCT No.: PCT/US2019/046644
§ 371 (c)(1),
(2) Date: Feb. 4, 2021

(87) PCT Pub. No.: WO2020/037117
PCT Pub. Date: Feb. 20, 2020

(65) Prior Publication Data
US 2021/0199543 A1 Jul. 1, 2021

Related U.S. Application Data

(60) Provisional application No. 62/764,712, filed on Aug. 15, 2018.

(51) Int. Cl.
*G01N 1/20* (2006.01)
*G01N 1/40* (2006.01)

(52) U.S. Cl.
CPC .............. *G01N 1/2035* (2013.01); *G01N 1/40* (2013.01); *G01N 2001/205* (2013.01)

(58) Field of Classification Search
CPC .............. G01N 1/2035; G01N 35/1095; G01N 2001/205; G01N 1/4005; G01N 35/1098;
(Continued)

(56) References Cited

U.S. PATENT DOCUMENTS

| 6,103,934 A | * | 8/2000 | Hallinan ................ C07C 51/12 |
| | | | 562/517 |
| 6,345,528 B2 | * | 2/2002 | Petro .................. G01N 15/0205 |
| | | | 210/663 |

(Continued)

FOREIGN PATENT DOCUMENTS

WO      99/50442      10/1999

OTHER PUBLICATIONS

European Extended Search Report, EP Patent App. 19849652.3, dated Mar. 31, 2022 (6 pages).
(Continued)

*Primary Examiner* — John Fitzgerald
*Assistant Examiner* — Truong D Phan
(74) *Attorney, Agent, or Firm* — Thomas | Horstemeyer, LLP

(57) ABSTRACT

The present disclosure provides for analysis systems that are configured to extract a fluid sample from a fluid (e.g., aqueous solution) in a reactor (e.g., bioreactor) at a first rate and then flow the fluid sample to a sensor system at a second rate to analyze the fluid sample. The sensor system can detect the presence and/or concentration of molecules (e.g., biomolecules such as biomarkers (e.g., metabolites, proteins, peptides, cytokines, growth factors, DNA, RNA, lipids) and cells of different types and cell properties, e.g., mechanical stiffness, etc.)). The data obtained can be used by a feedback control system to modify, as needed, the conditions in the reactor to enhance the productively of the reactor.

19 Claims, 20 Drawing Sheets

(58) Field of Classification Search
CPC .......... G01N 1/14; G01N 1/2247; G01N 1/18; G01N 35/1097; G01N 1/20; G01N 1/4044; G01N 30/20; G01N 2001/2064; G01N 1/40; G05D 7/0664; C12M 29/00
See application file for complete search history.

(56) References Cited

U.S. PATENT DOCUMENTS

| | | | |
|---|---|---|---|
| 2002/0192113 A1 | 12/2002 | Uffenheimer | |
| 2011/0253224 A1* | 10/2011 | Linder | G01N 21/76 137/2 |
| 2012/0195795 A1* | 8/2012 | Parzermair | G01N 33/182 422/67 |
| 2015/0118761 A1 | 4/2015 | Fraden et al. | |
| 2015/0219650 A1 | 8/2015 | Viovy et al. | |
| 2016/0320355 A1 | 11/2016 | Krummen et al. | |

OTHER PUBLICATIONS

Zhao, Liang, et al., "Advances in process monitoring tools for cell culture bioprocesses," Eng. Life Sci., vol. 15 (2015), pp. 459-468.

Broger, Tobias, et al., "Real-time on-line flow cytometry for bioprocess monitoring," Journal of Biotechnology, vol. 154 (2011), pp. 240-247.

Chilmonczyk, Mason A., et al., "Dynamic mass spectrometry probe for electrospray ionization mass spectrometry monitoring of bioreactors for therapeutic cell manufacturing," Biotechnology and Bioengineering, vol. 116 (2019), pp. 121-131.

Baker, Shannon, "Bioreactors for cell therapies: Current status and future advances," Cytotheraphy, vol. 19 (2017), pp. 9-18.

International Search Report for PCT/US19/46644 dated Oct. 29, 2019, 9 pgs.

* cited by examiner

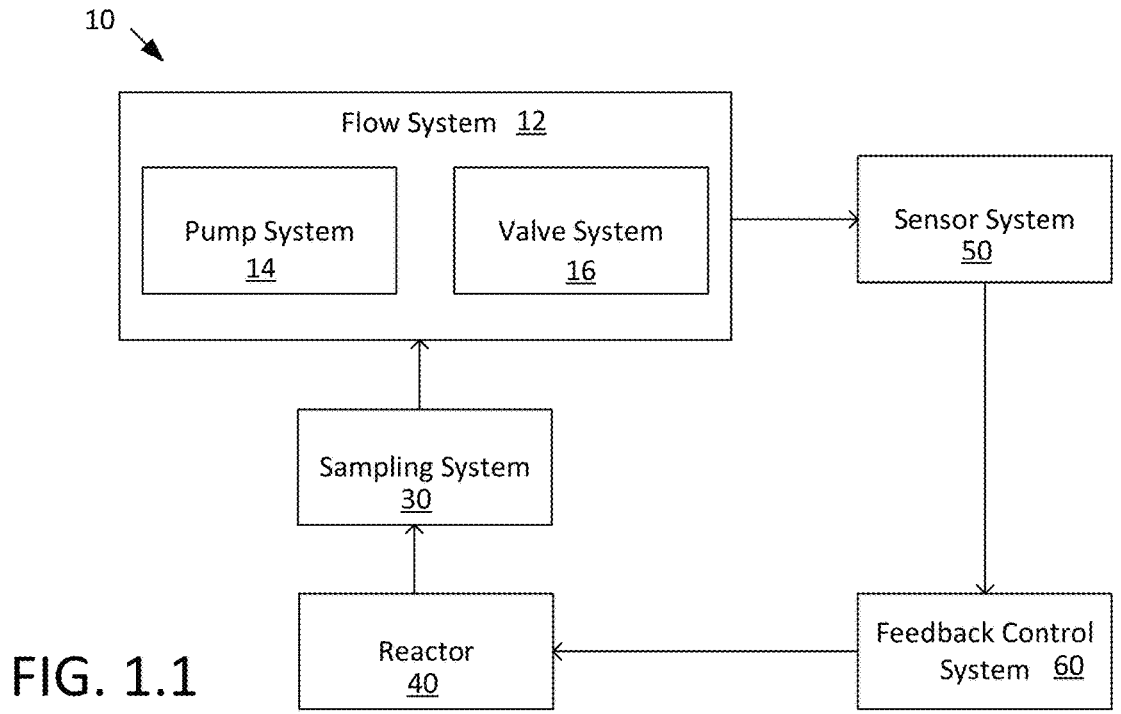
FIG. 1.1
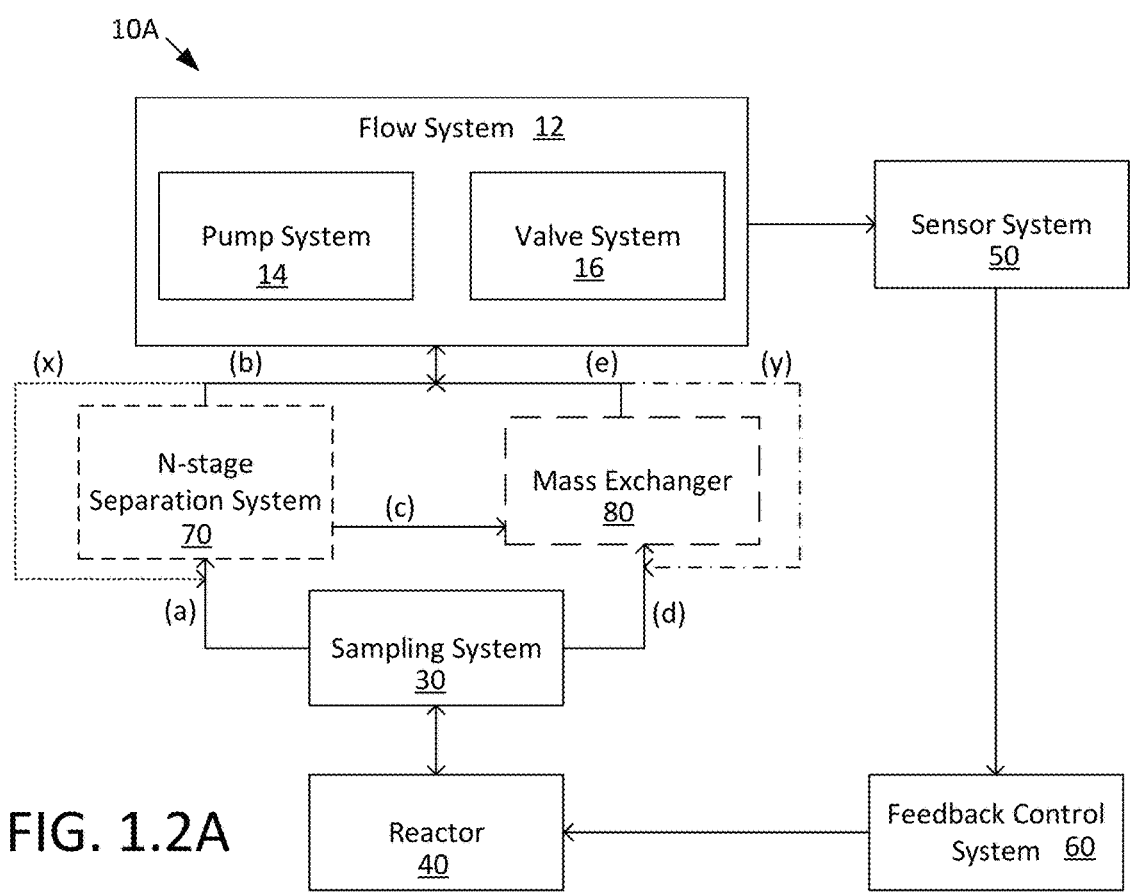
FIG. 1.2A

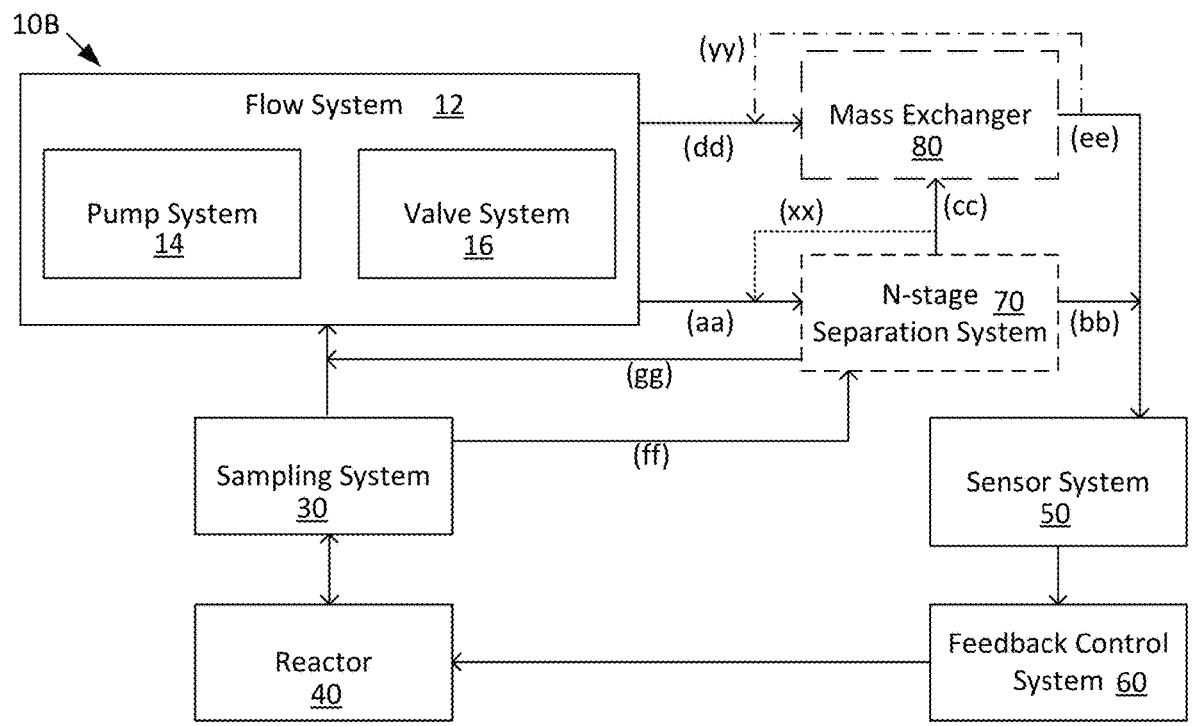
FIG. 1.2B
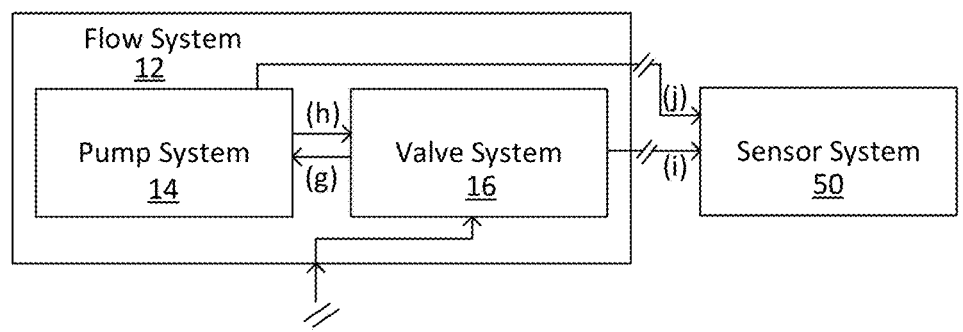
FIG. 1.3

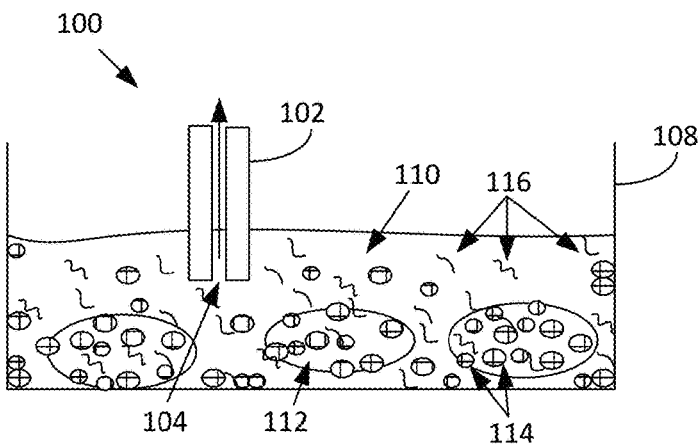
FIG. 1.4A
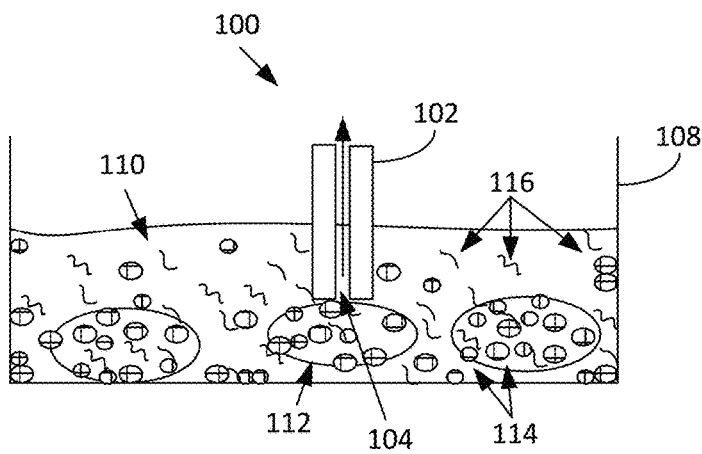
FIG. 1.4B
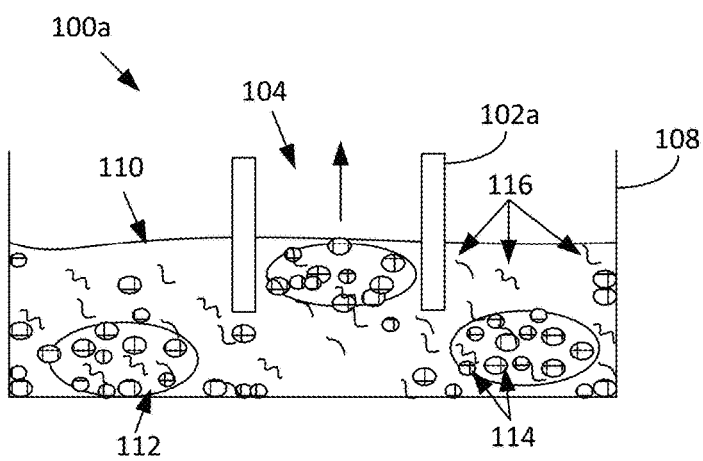
FIG. 1.4C

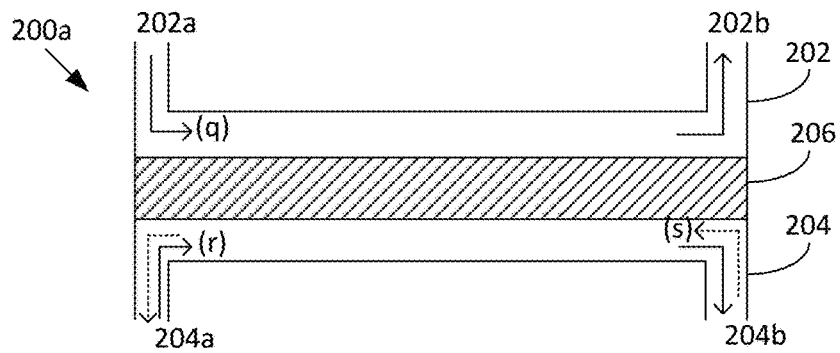
FIG. 1.5A
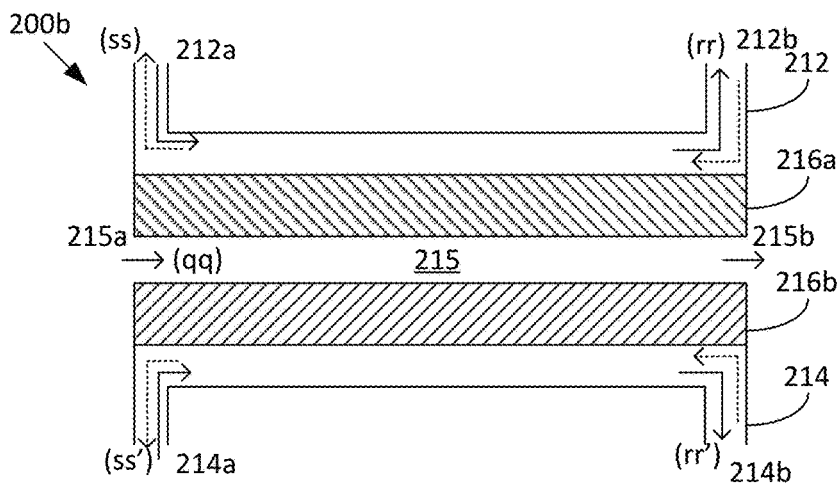
FIG. 1.5B
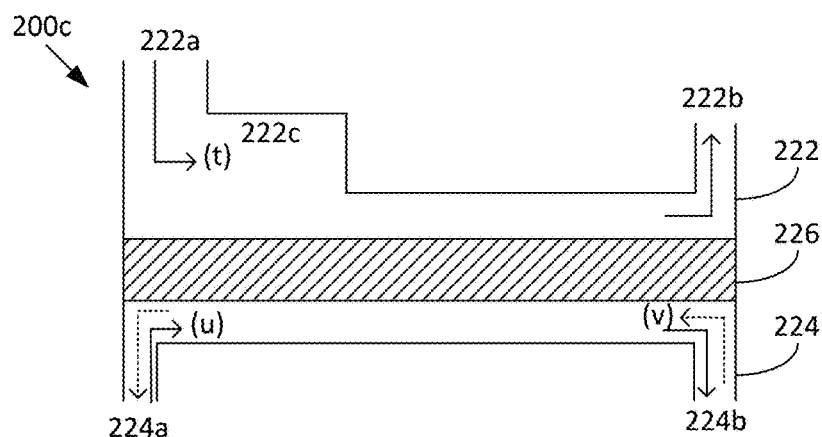
FIG. 1.6A
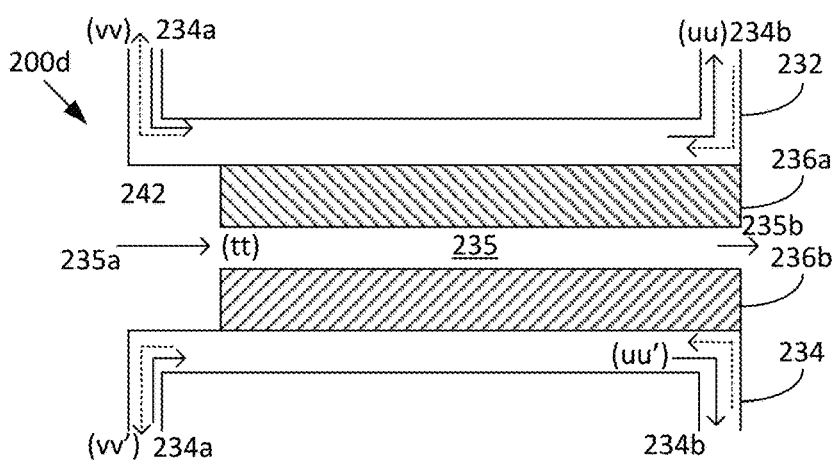
FIG. 1.6B

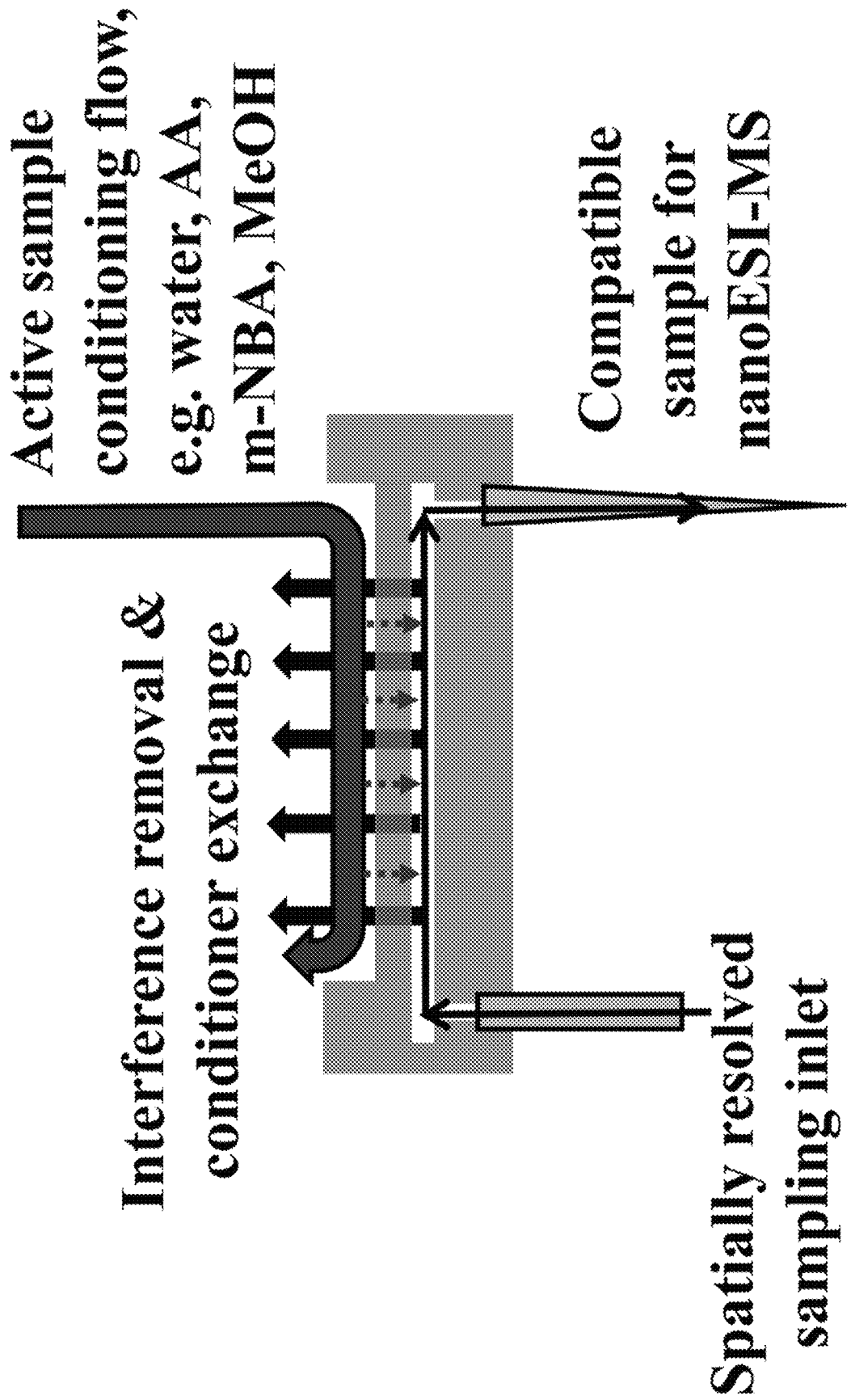
FIG. 2.1

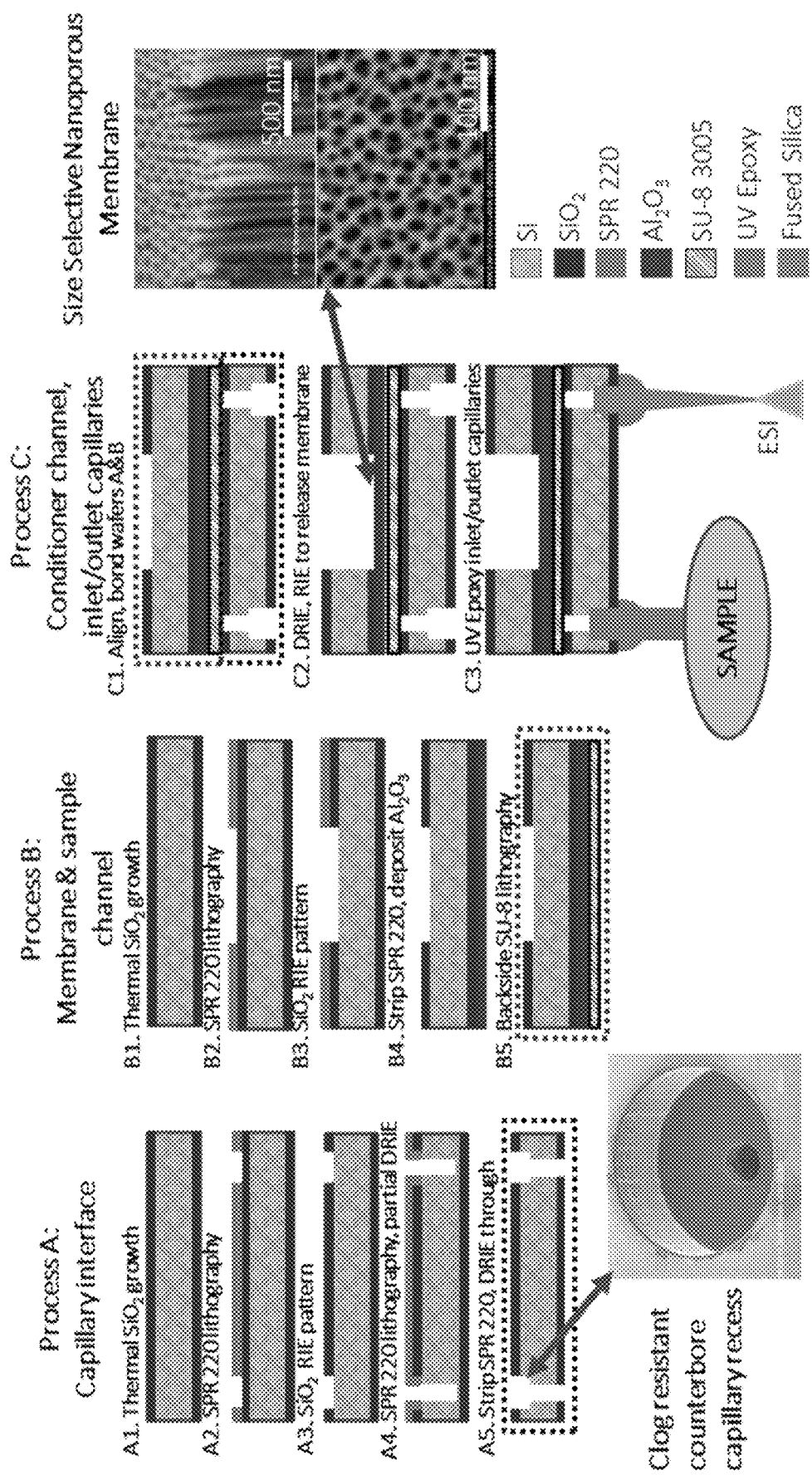
FIG. 2.2

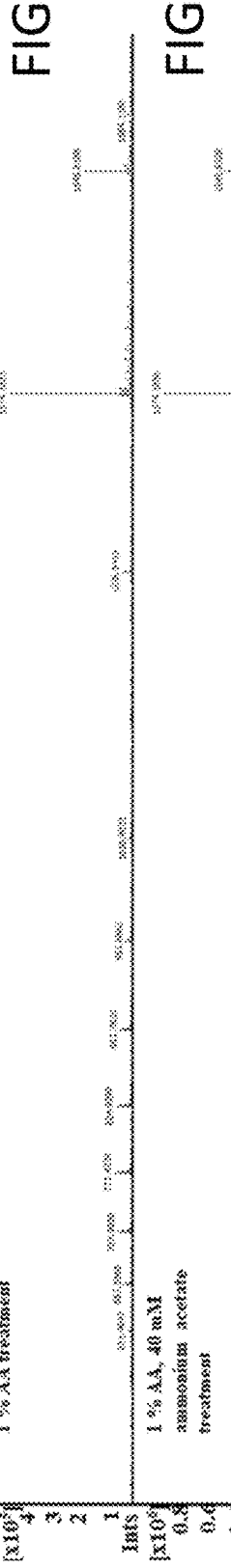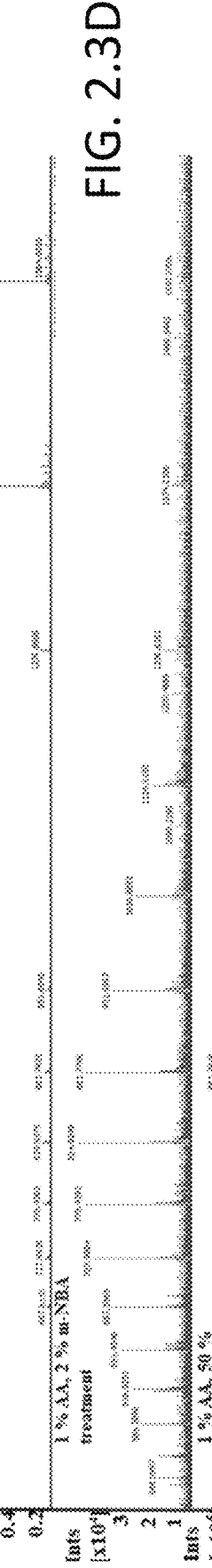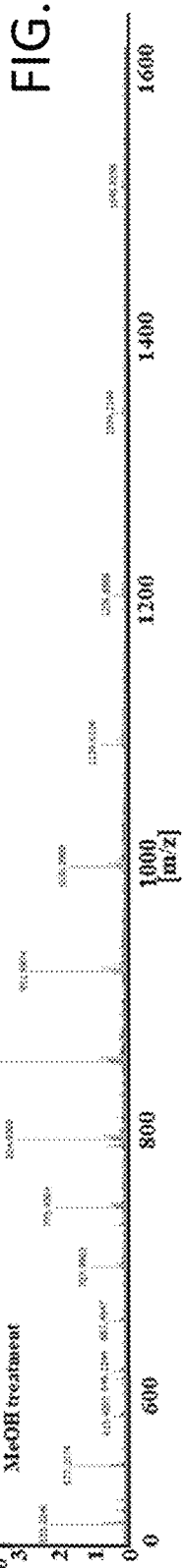
FIG. 2.3A
FIG. 2.3B
FIG. 2.3C
FIG. 2.3D
FIG. 2.3E

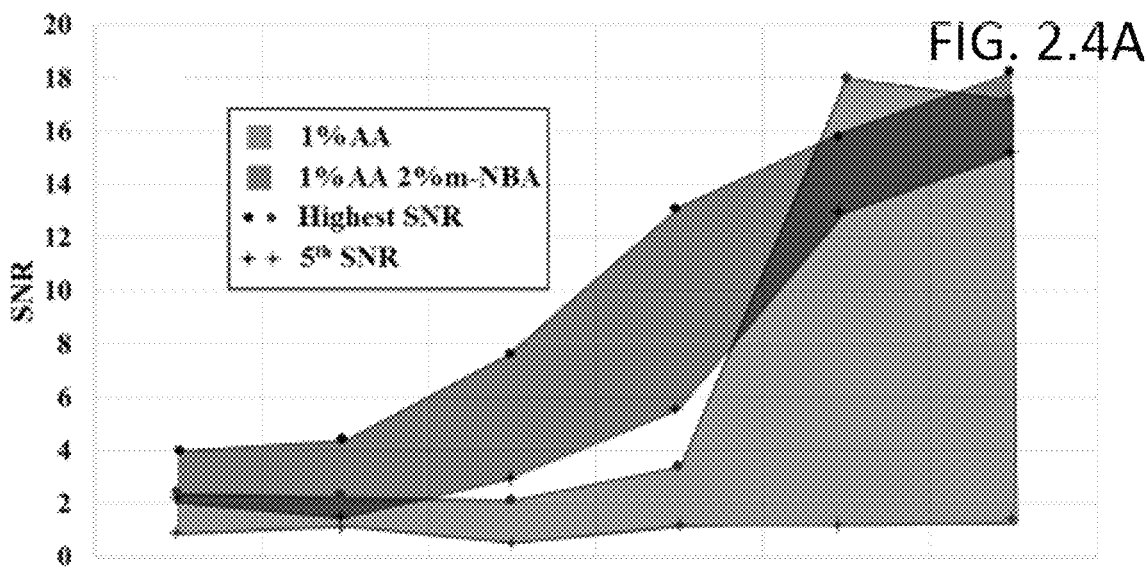
FIG. 2.4A
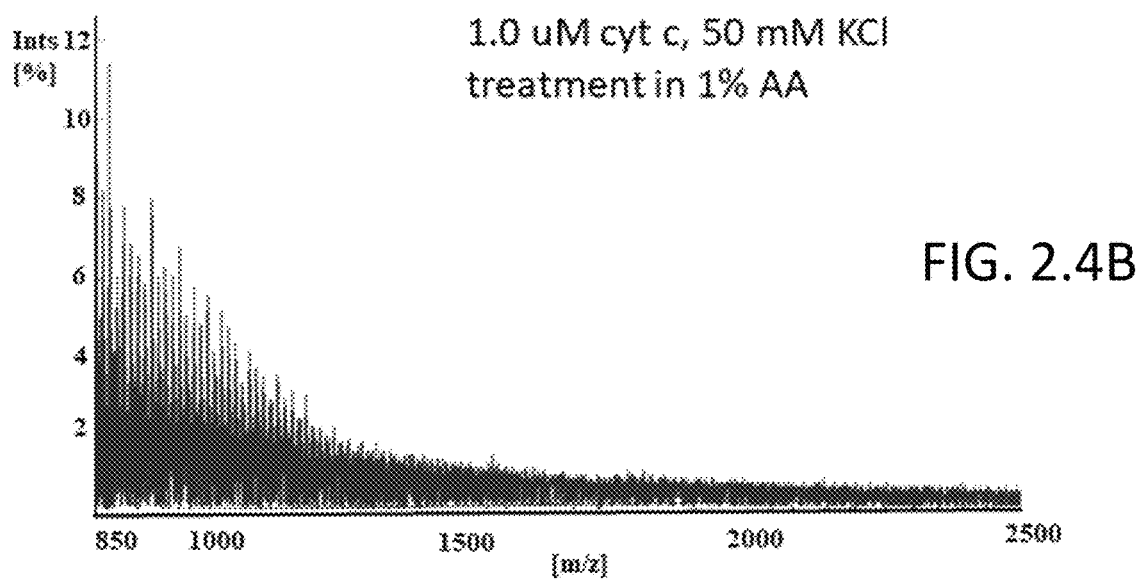
FIG. 2.4B
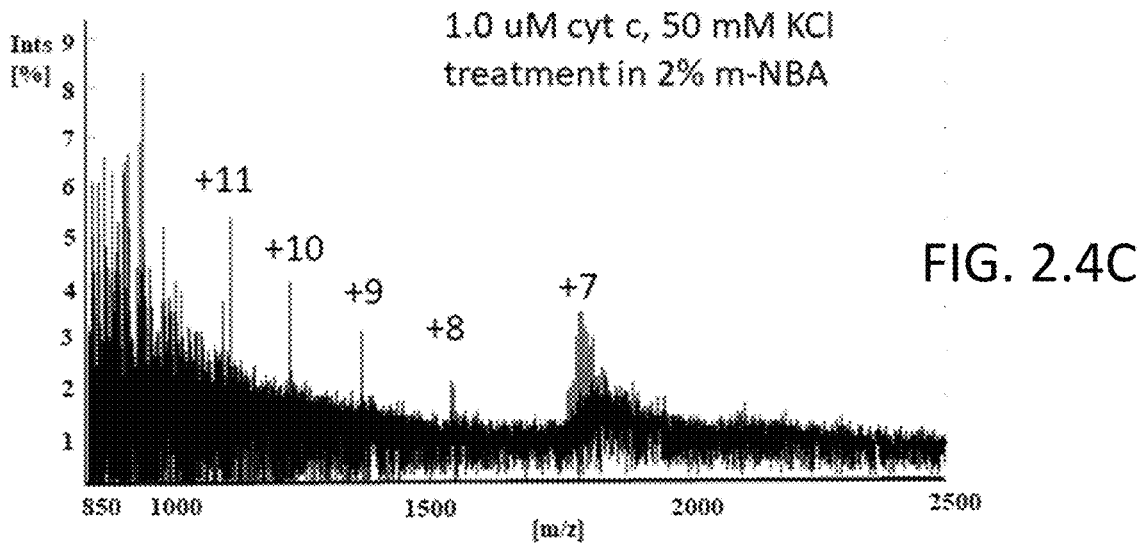
FIG. 2.4C

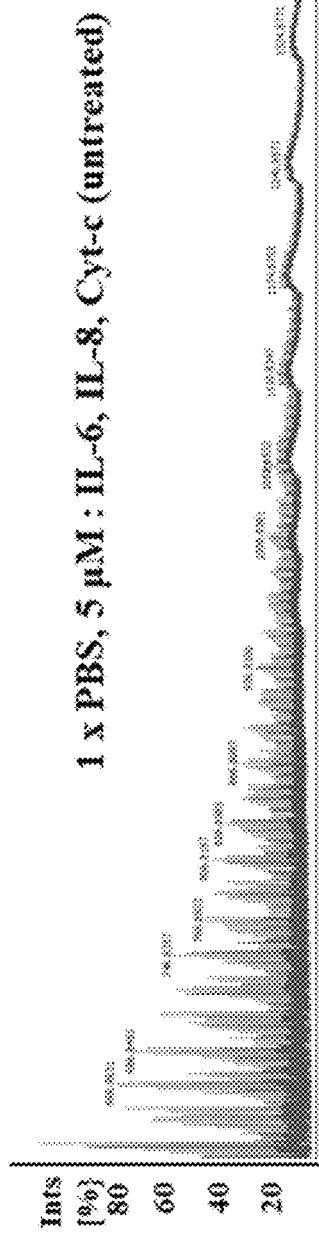
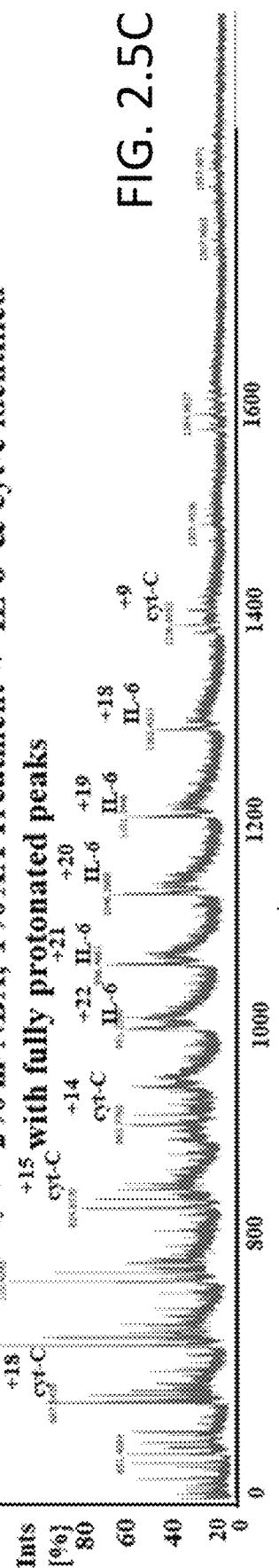
FIG. 2.5A — 1 x PBS, 5 µM : IL-6, IL-8, Cyt-c (untreated)
FIG. 2.5B — 1% AA Treatment -> IL-6 identified, accompanied by adduct peaks
FIG. 2.5C — 2% m-NBA, 1% AA Treatment -> IL-6 & cyt-c identified with fully protonated peaks

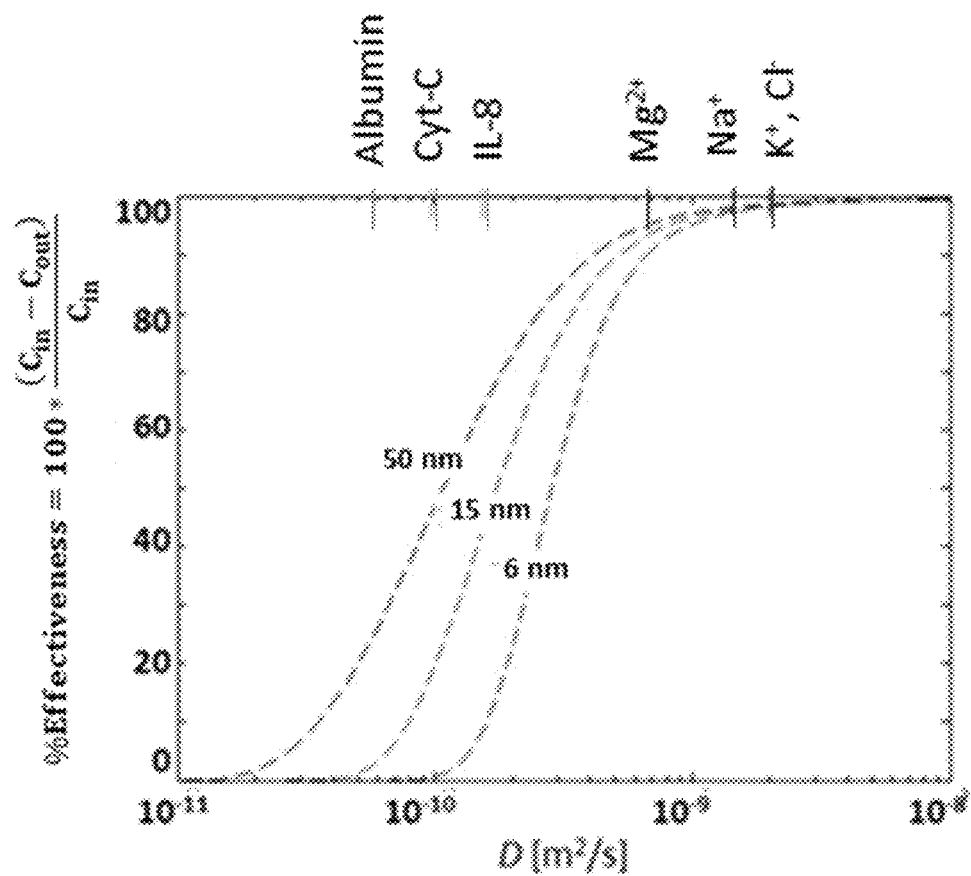
FIG. 2.6A
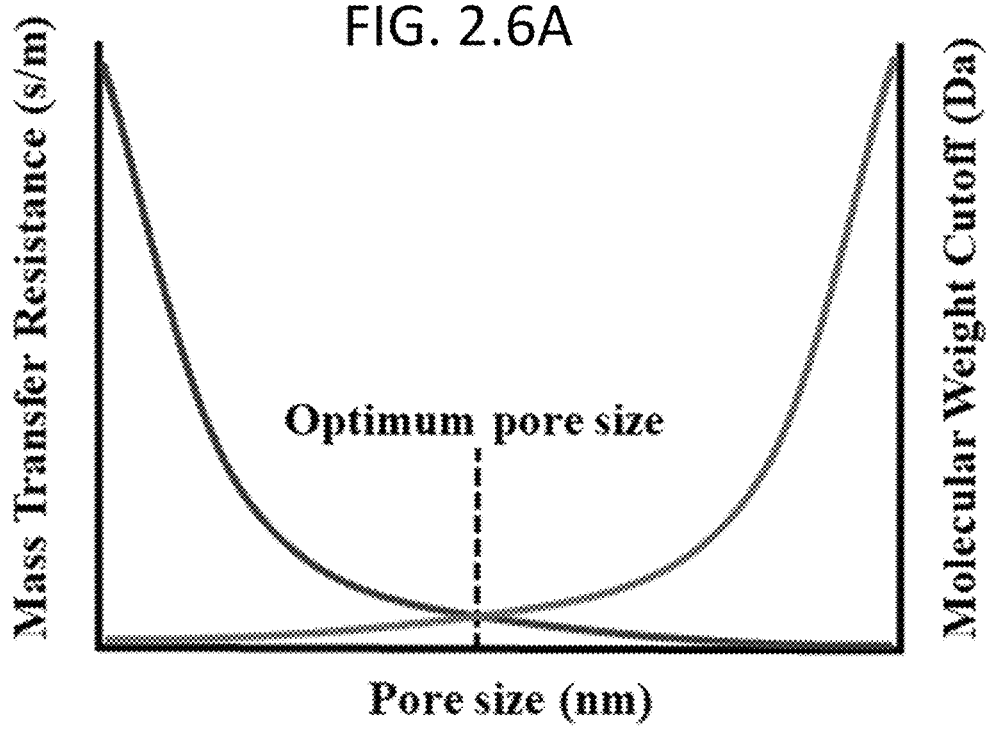
FIG. 2.6B $$J'' = \frac{|C_{cond.} - C_{sample}|}{R_{cond.} + R_{membrane} + R_{sample}}$$
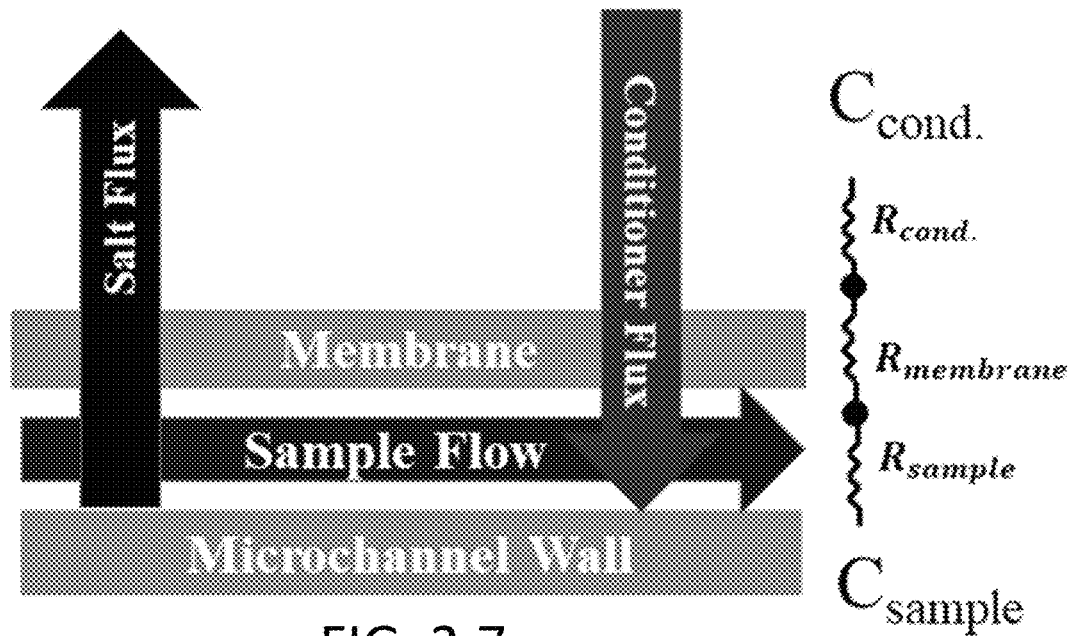
FIG. 2.7
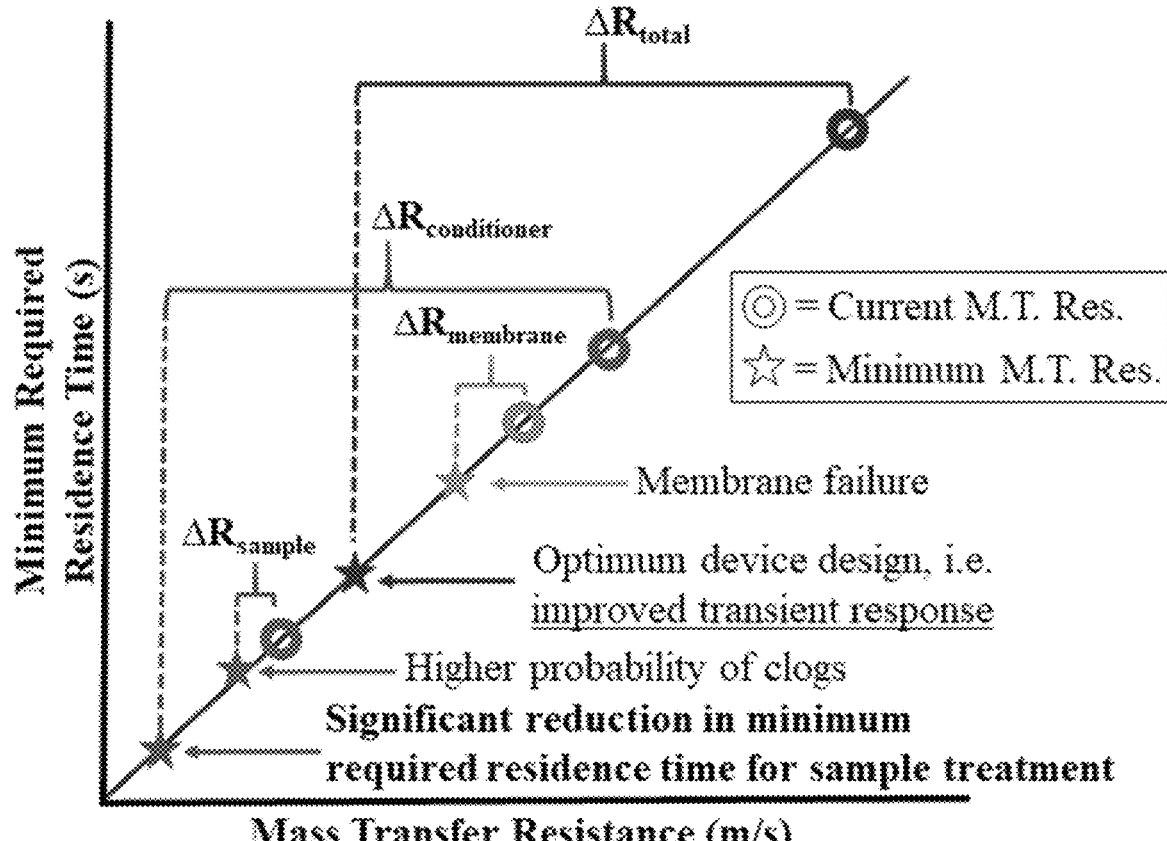
FIG. 2.8

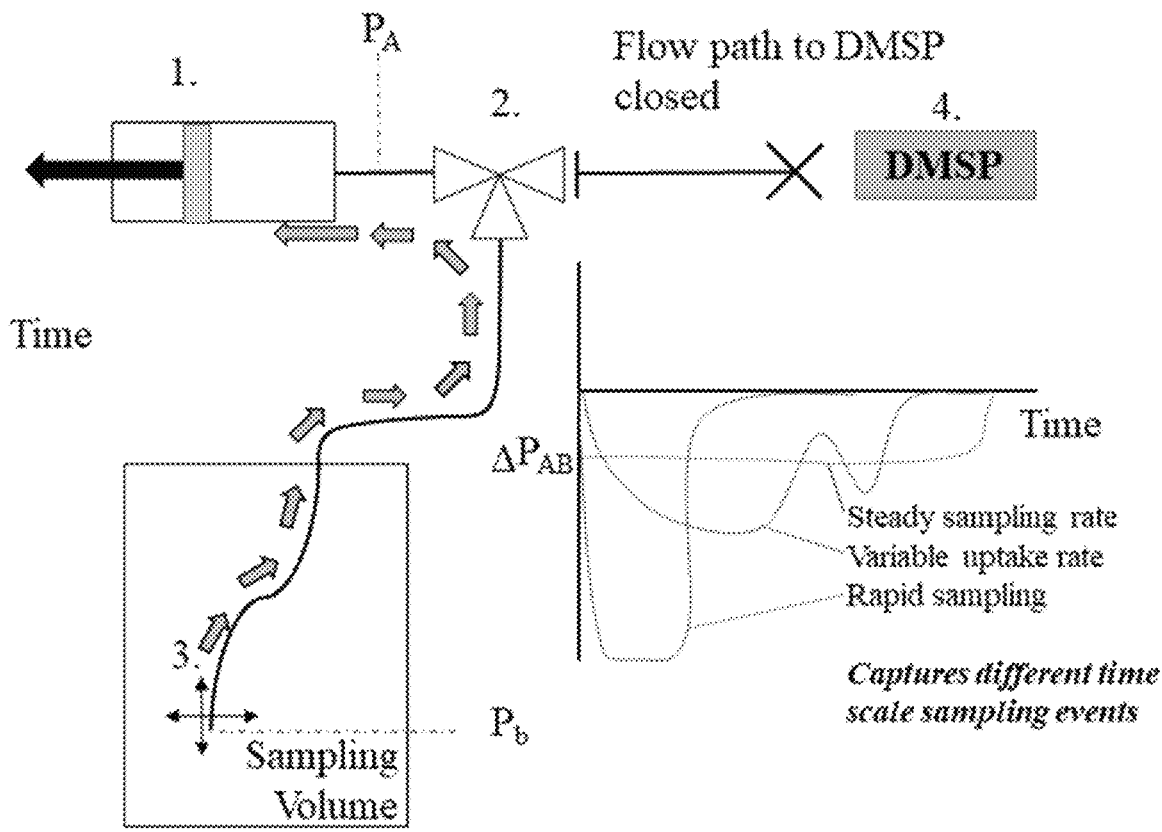
FIG. 2.9A
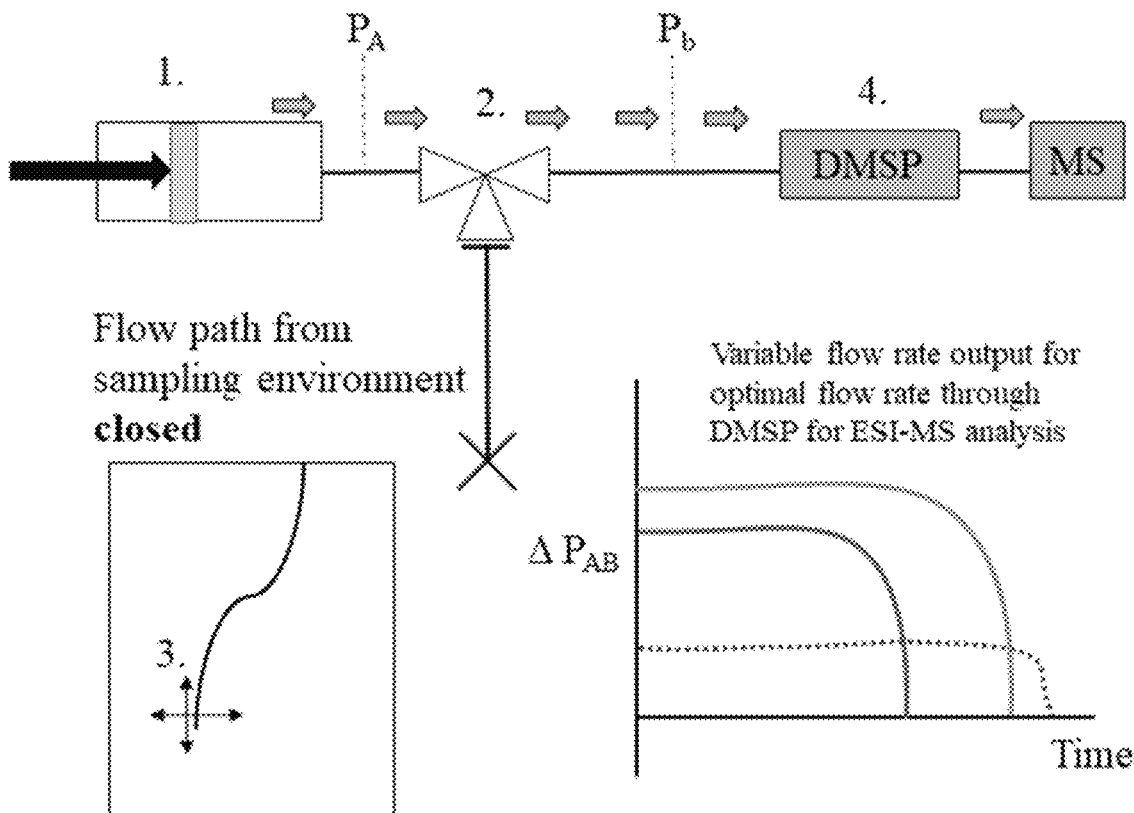
FIG. 2.9B

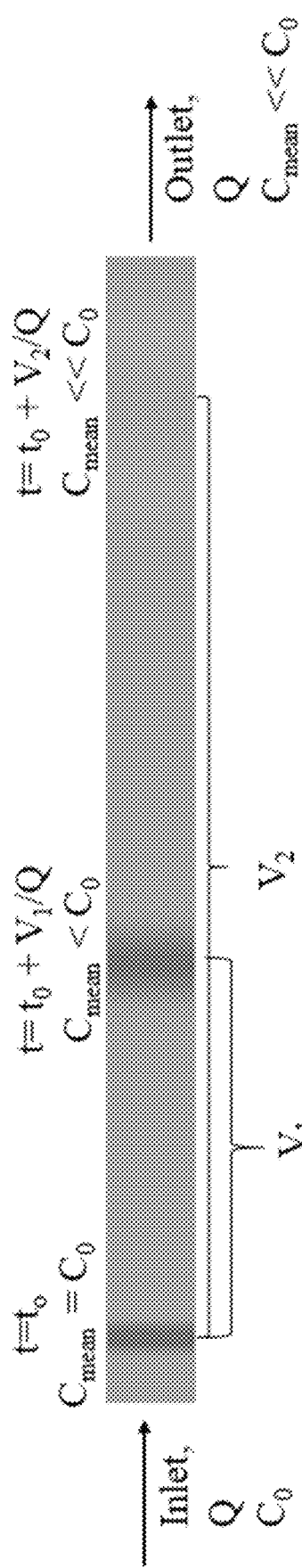
FIG. 2.10A
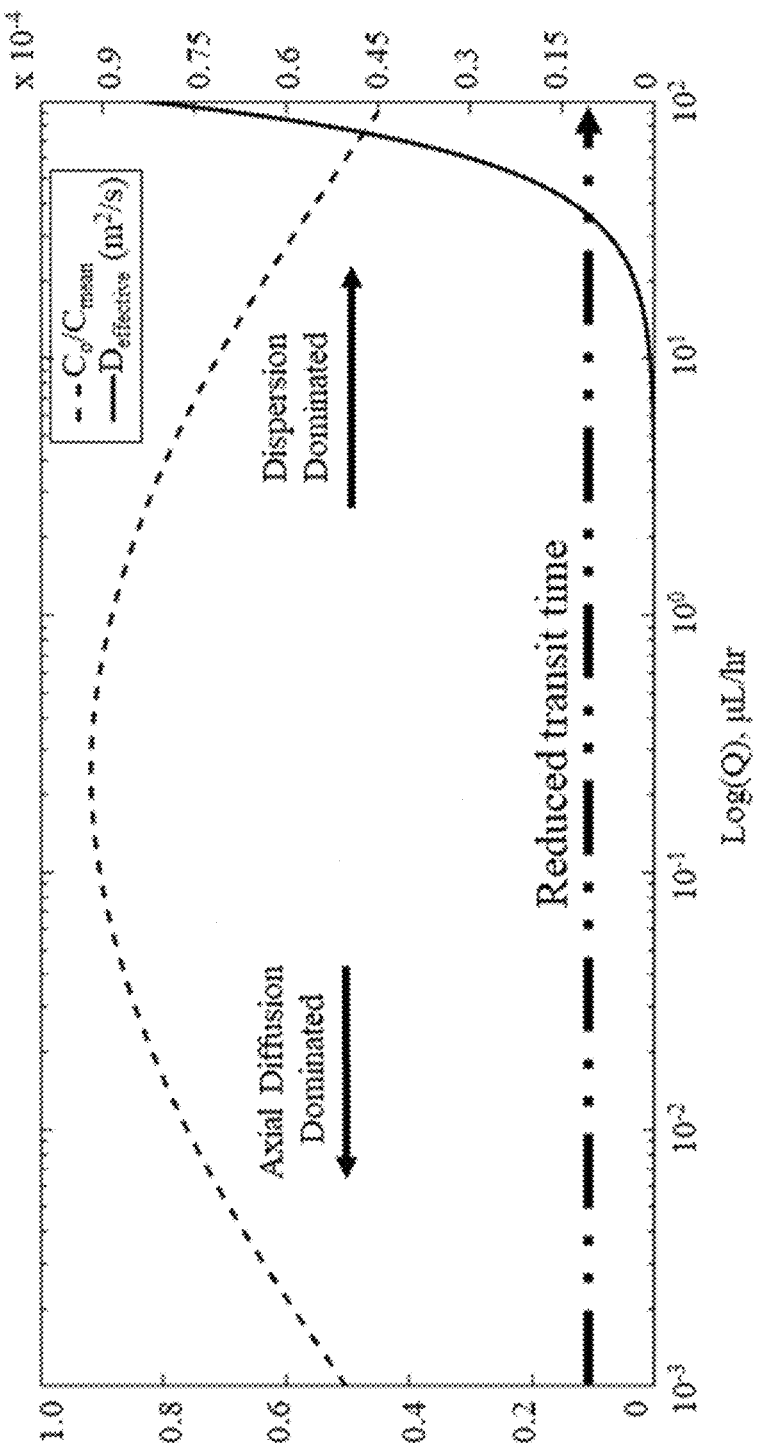
FIG. 2.10B

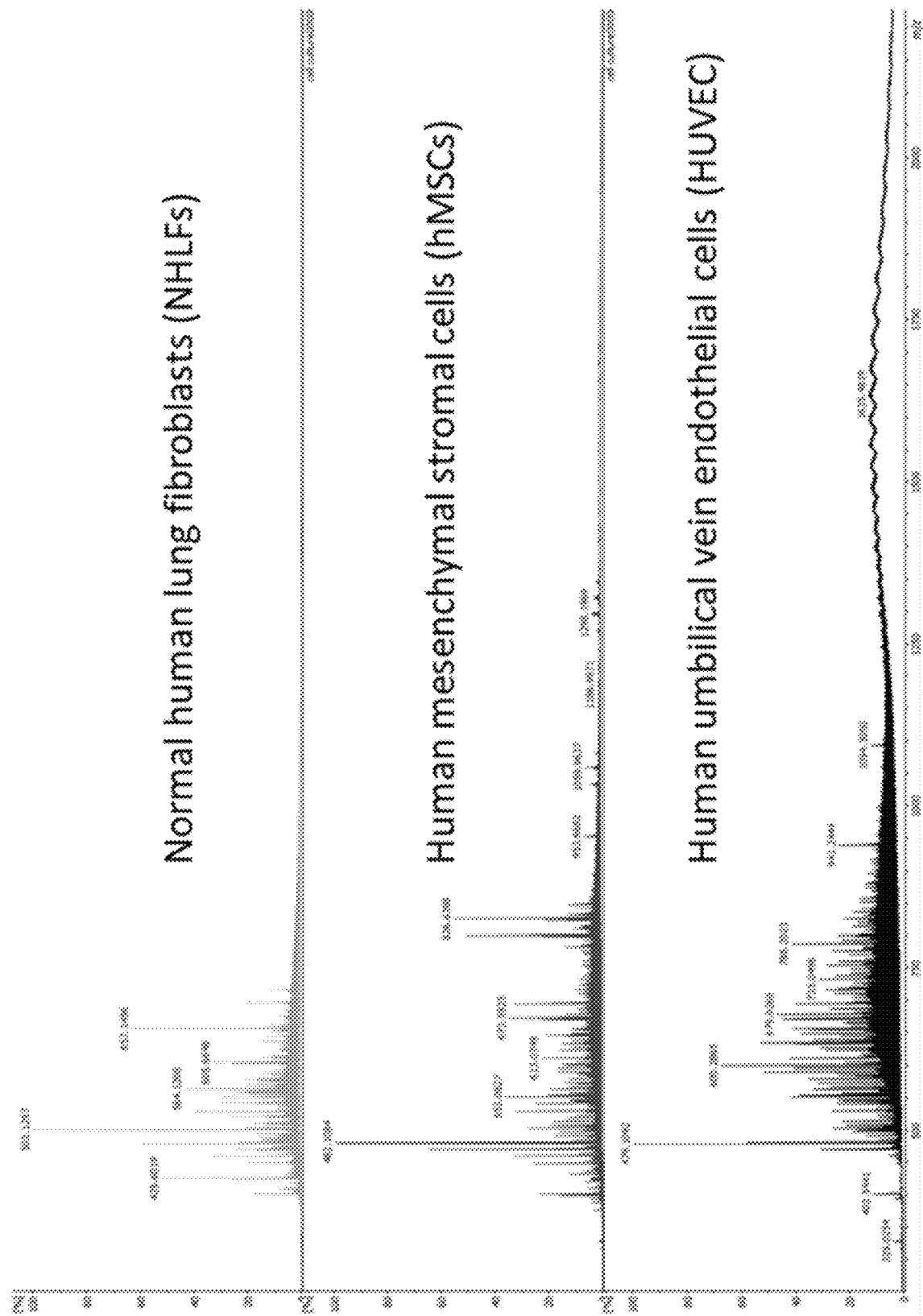
FIG. 2.11

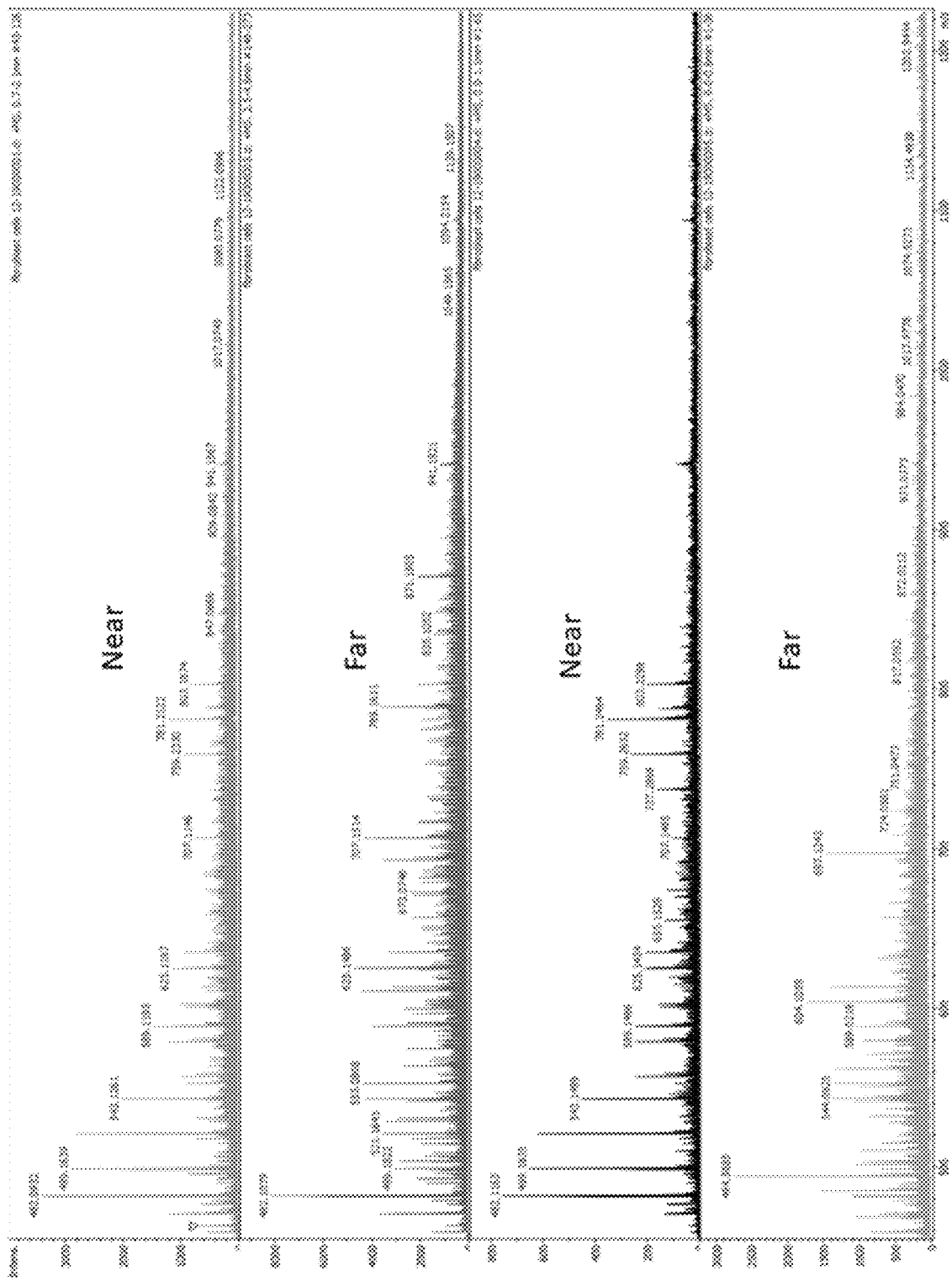
FIG. 2.12

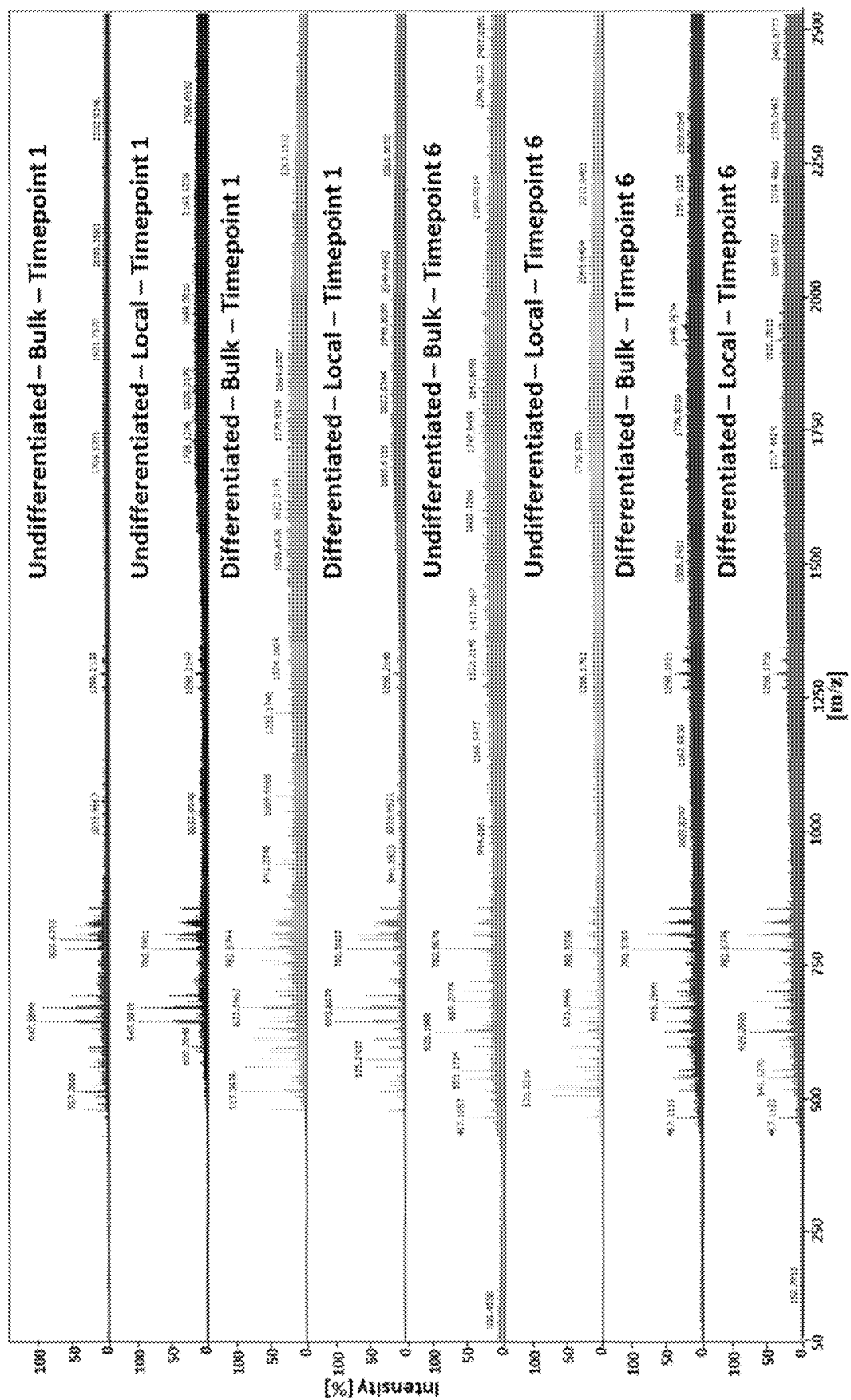
FIG. 3.1

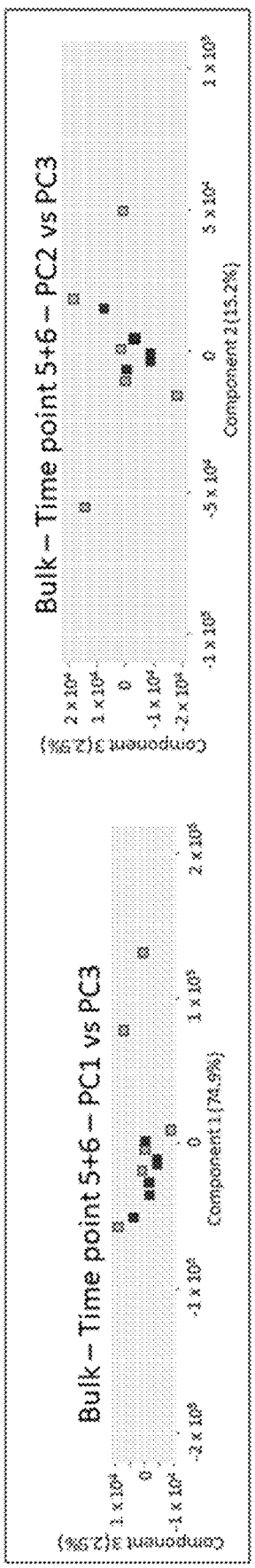
FIG. 3.2A
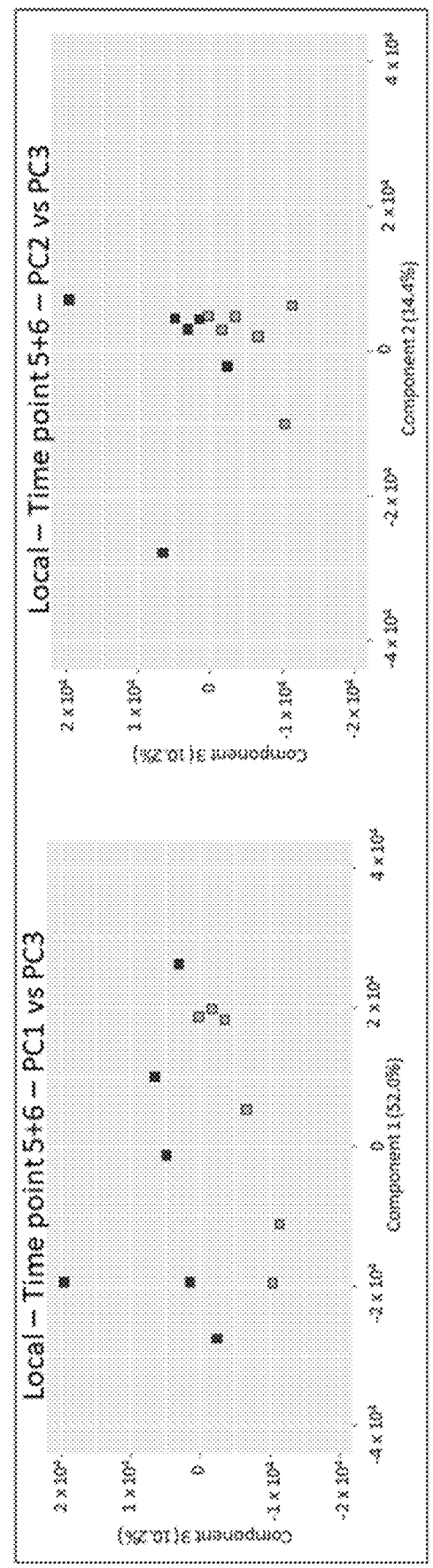
FIG. 3.2B

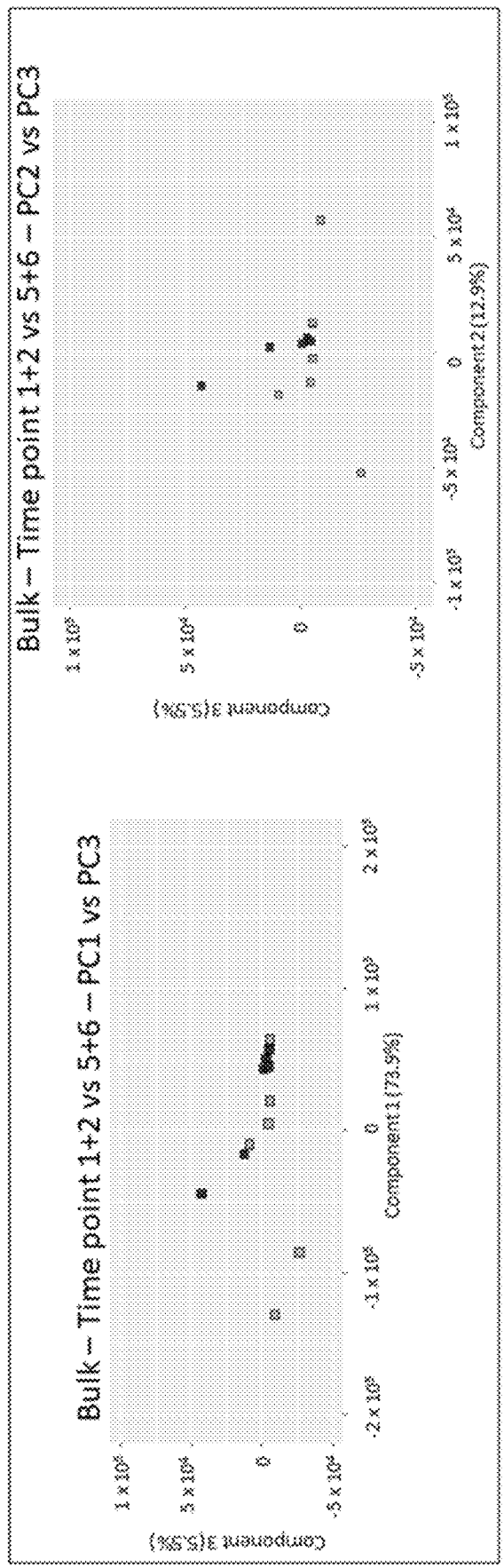
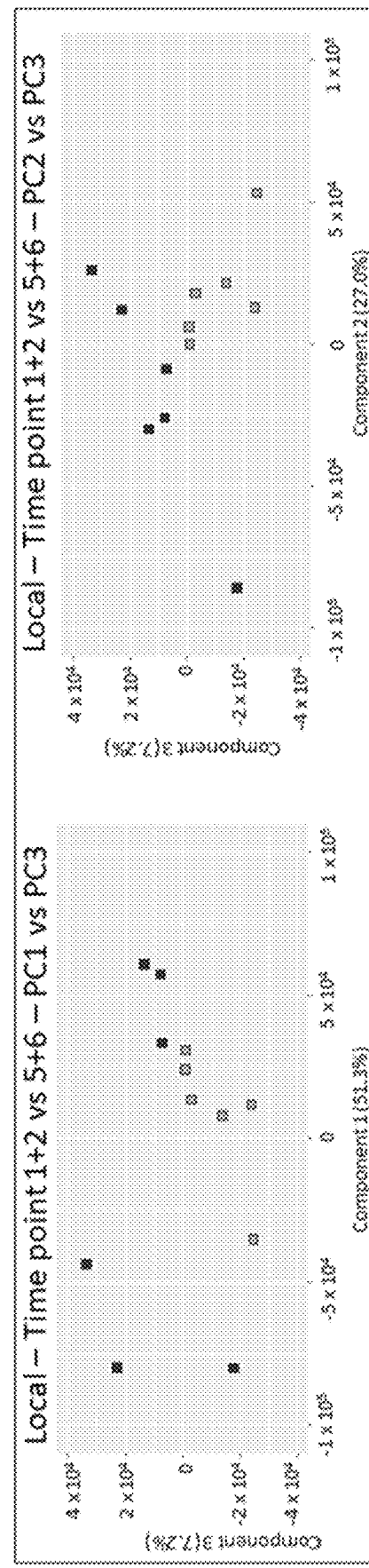
FIG. 3.3A
FIG. 3.3B

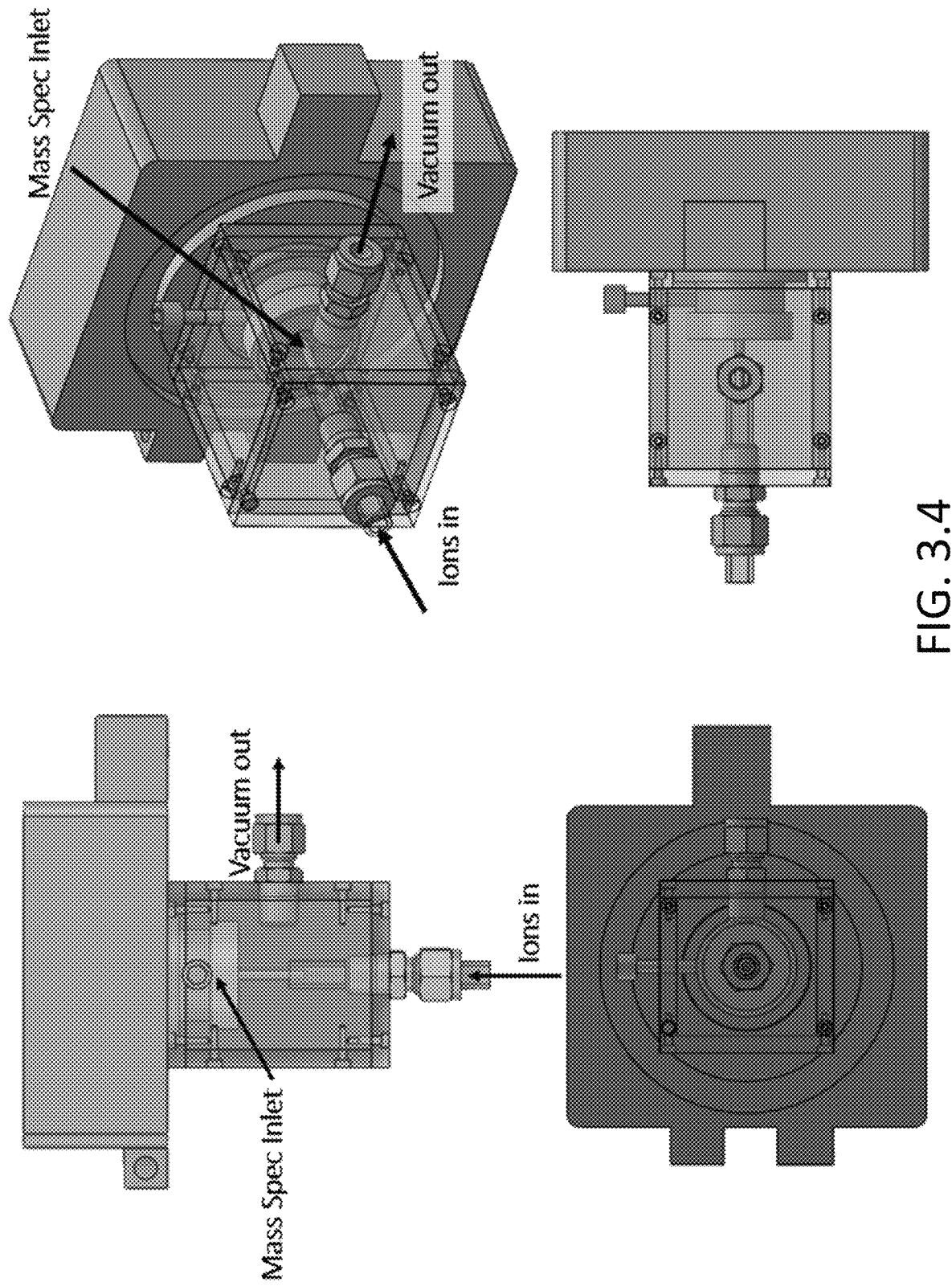
FIG. 3.4

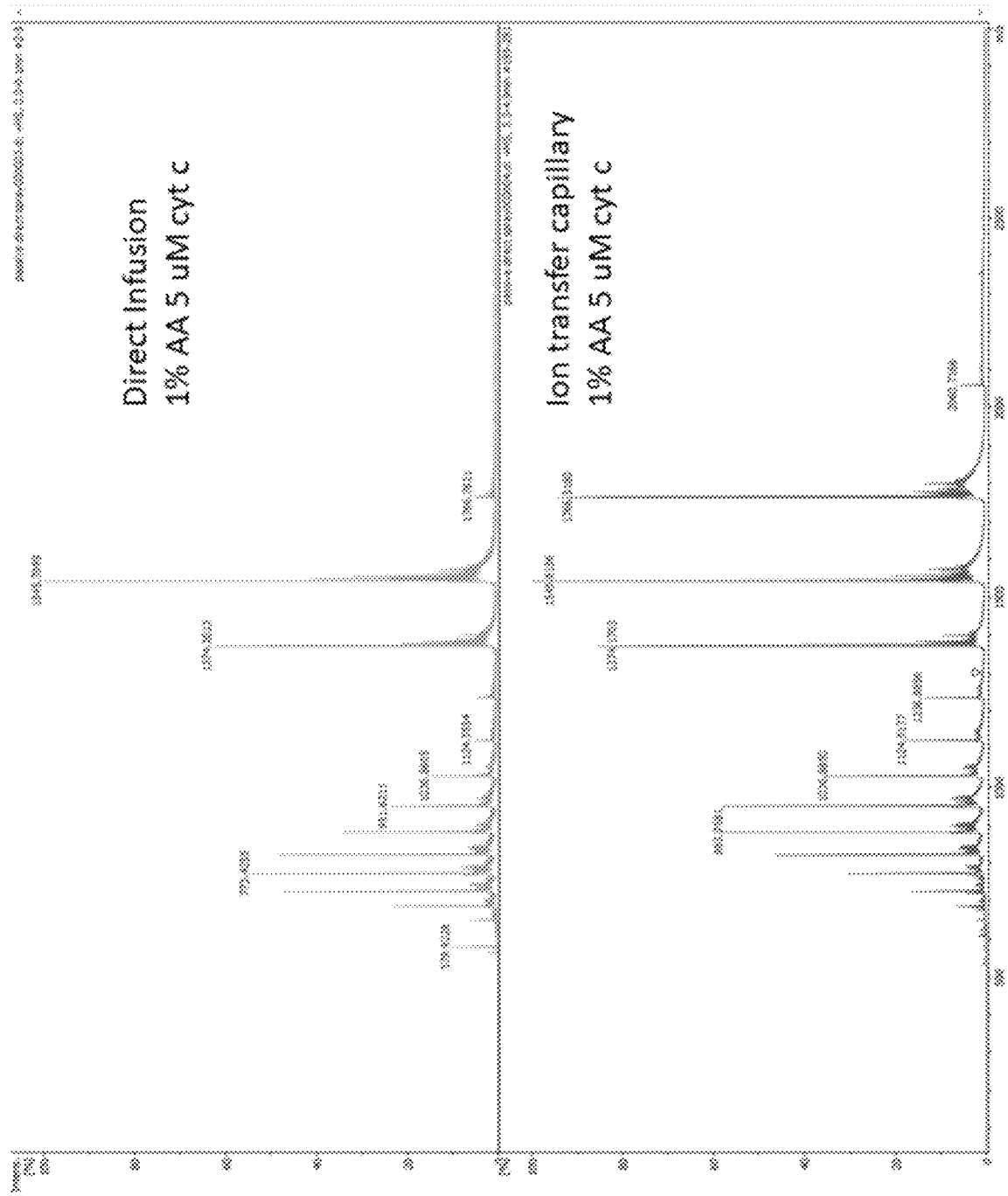
FIG. 3.5

ANALYSIS SYSTEM AND METHODS OF USE THEREOF

CLAIM OF PRIORITY TO RELATED APPLICATION

This application is the 35 U.S.C. § 371 national stage application of PCT Application entitled "ANALYSIS SYSTEM AND METHODS OF USE THEREOF" having serial no. PCT/US19/46644, filed Aug. 15, 2019, where the PCT claims priority to, and the benefit of the contents of U.S. provisional application entitled "Multisensor Dynamic Sampling Platform (DSP-X) for Continuous Bioreactor Monitoring and Feedback Control" having Ser. No. 62/764,712 filed on Aug. 15, 2018, which are entirely incorporated herein by reference.

STATEMENT REGARDING FEDERALLY SPONSORED RESEARCH OR DEVELOPMENT

This invention was made with government support under grant 1648035 awarded by the National Science Foundation and under grant GM112662 awarded by the National Institutes of Health. The government has certain rights in the invention.

BACKGROUND

Cell therapies and drug developed using them have been shown to successfully treat a range of life threatening illnesses and injuries. In order to enable large scale and cost effective adaption of cell therapies, quality control methodologies and standards for therapeutic cell manufacturing need to be established. During the production of therapeutic cells, levels of various components used to grow the cells and cell responses thereto and changes that occur to cells during growth should be monitored to ensure cell health, efficacy, and differentiation. In particular, quality control indicators (QCIs) (e.g., metabolites, cytokines, and various other proteins and biomolecules) directly related to cell health, efficacy, and differentiation can be monitored. Monitoring the QCIs is complex due to a wide range of molecular weights, different QCIs for different cell types, and a wide range of concentrations. As a result, there is a need to overcome at least these complexities among others.

SUMMARY

The present disclosure provides for analysis systems that are configured to extract a fluid sample from a fluid (e.g., aqueous solution) in a reactor (e.g., bioreactor) at a first rate and then flow the fluid sample to a sensor system at a second rate to analyze the fluid sample. The sensor system can detect the presence and/or concentration of molecules (e.g., biomolecules). The data obtained can be used by a feedback control system to modify, as needed, the conditions in the reactor to enhance the productively of the reactor.

An embodiment of the present disclosure includes a system having a flow system that includes a pump system and a valve system, where the pump system and the valve system are in fluidic communication along with a sampling system in fluidic communication with the flow system. The system also includes a reactor including a fluid, where the sampling system is in fluidic communication with the reactor. In a first configuration of the flow system, the fluid sample is flowed from the reactor to the pump system through the valve system at a first flow rate. A sensor system is in fluidic communication with the flow system. In a second configuration of the valve system, the fluid sample is flowed from the pump system to the sensor system at a second flow rate. The sensor system is configured to analyze the fluid sample. The system can also comprise a feedback control system, n-stage separation/fractionation/trapping system, and/or mass exchanger. The system can further comprise a separation/fractionation/trapping system in fluidic communication with the flow system and the sampling system, wherein the separation/fractionation/trapping system is configured to separate a first group of components from the fluid sample to produce a separated/fractionated fluid sample, wherein the separated/fractionated fluid sample is analyzed by the sensor system. The system can further comprise a mass exchanger in fluidic communication with the flow system and the sampling system, wherein the mass exchanger is configured to condition the fluid sample to produce a conditioned fluid sample for analysis by the sensor system.

An embodiment of the present disclosure provides for a method of analyzing a fluid sample comprising: extracting the fluid sample from a reactor comprising a fluid, wherein the reactor is in fluidic communication with a sampling system; flowing the fluid sample through the sampling system to a flow system at a first flow rate, wherein the flow system comprises a pump system and a valve system, wherein the flow system in conjunction with the sampling system controls the extraction of the fluid sample from the fluid, wherein the flow system is also in fluidic communication with a sensor system; and flowing the fluid sample from the flow system to the sensor system at a second flow rate, wherein the sensor system is configured to configured to analyze the fluid sample. The method can further comprise flowing the fluid to a separation/fractionation/trapping system, wherein the separation/fractionation/trapping system is configured to separate a first group of components from the fluid sample. The method can further comprise flowing the fluid sample to a mass exchanger, wherein the mass exchanger is configured to condition the separated fluid.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1.1, 1.2A, and 1.2B illustrate embodiments of the analysis system.

FIG. 1.3 illustrate an embodiment of a portion of the analysis system.

FIG. 1.4A-1.4C illustrates a schematic of extracting fluid samples from a reactor.

FIGS. 1.5A-1.5B illustrate a cross-sectional view of embodiments of a mass exchanger.

FIGS. 1.6A-1.6B illustrate a cross-sectional view of embodiments of a mass exchanger.

FIG. 2.1 is schematic of Dynamic Mass Spectrometry Probe (DMSP) operating principles according to embodiments of the present disclosure. Active sample conditioning through size selective mass exchanger simultaneously removes interferences and infuses ESI-MS enhancing chemicals into a sample through a size selective membrane.

Large target biomolecules are retained in the sample while allowing smaller molecules to diffuse freely in/out of the sample.

FIG. 2.2 provides examples of dynamic Mass Spectrometry Probe (DMSP) mass exchanger microfabrication with subsequent integration of sampling/ESI capillaries according to embodiments of the present disclosure.

FIGS. 2.3A-2.3E provide examples of DMSP "active sample conditioning" treatment of 100 mM KCl with 5 uM cytochrome-c (cyt-c). FIG. 2.3A shows untreated. FIG. 2.3B shows 1% AA treatment reveals cyt-c signal. FIG. 2.3C shows that addition of 40 mM ammonium acetate increases signal intensity of cyt-c. FIG. 2.3D shows 2% m-NBA supercharging molecule shifts the charge state distribution FIG. 2.3E shows 50% methanol in as an active conditioner denatures cyt-c, leading to a similar shift in charge state distribution.

FIGS. 2.4A-2.4C provide examples of enhanced signal to noise ratio (SNR) and limit of detection (LOD) enabled by active sample treatment. FIG. 2.4A provides a plot of the highest and 5th highest SNR for 50 mM KCl with 0.25, 0.5, 1, 2.5, 5, and 10 μm cyt-c shows that 2% m-NBA, 1% AA treatment drastically increases the SNR across all concentrations explored, and decreases the LOD (detected molecule>2.5 SNR) from 2.5 to 0.25 μM. FIG. 2.4B provides resulting mass spectra of 1% AA treatment for 50 mM KCl with 1 μM cyt-c shows no characteristic peaks FIG. 2.4C shows an addition of 2% m-NBA to active sample treatment and reveals multiple, fully protonated peaks associated with cyt-c, indicating the power of DMSP active sample treatment.

FIGS. 2.5A-2.5C demonstrate multicomponent detection enabled by active sample conditioning via DMSP online ESI-MS. FIG. 2.5A shows untreated 1×PBS with 5 μm of IL-6, IL-8, and cyt-C shows no characteristic protein peaks. FIG. 2.5B shows the sample with 1% AA treatment, heavily salt adducted IL-6 peaks are observed FIG. 2.5C shows active sample treatment with 2% m-NBA, fully protonated peaks associated with both cyt-c and IL-6 observed.

FIG. 2.6A shows the relationship between pore size and DMSP percent effectiveness. By reducing the pore size from the current size of 50 nm to smaller diameters, the device is less "effective" at removing biomolecules but removes parasitic salt ions just as effectively. In this figure, $C_{in}$ and $C_{out}$ represent the mass exchanger inlet and outlet concentrations of any species. FIG. 2.6B demonstrates that reducing pore size creates a more size selective device (e.g. less analyte loss), but increases the mass transfer resistance associated with the membrane, which will reduce the amount of interfering compounds removed and increase residence time in DMSP. An optimum pore size design can be selected based on these trends.

FIG. 2.7 provides an example, according to embodiments of the present disclosure, of how rate of mass transfer (i.e. flux, J") can be calculated based on the total resistance within the DMSP mass exchanger. In this diagram, J" for the salt/conditioner is always positive and in the direction of the respective arrow.

FIG. 2.8 shows that with a reduction in any of the three resistances, the total mass transfer resistance and hence residence time within the mass exchanger is improved, which results in a better transient response. However, reducing the resistance associated with the sample channel will lead to a higher incidence of clogs. Reducing the thickness of the membrane, and hence the resistance (assuming pore size is fixed) may lead to membrane structural failure. In the current DMSP design, the largest resistance is in the conditioner channel, making it the best target for immediate optimization efforts.

As shown in FIGS. 2.9A-2.9B, DMSP dynamic sampling interface (DSI) consists of 4 components: 1. A bi-directional, variable flow rate pump with sample for uptake/infusion; 2. A switching valve for isolating sampling/infusion steps; 3. A sampling probe for localized secretome intake; and 4. interconnecting tubing for sample transport to DMSP. FIG. 2.9A shows that sample uptake can be carried out with dynamic pressure profiles tuned for rapid, low dilution sampling. FIG. 2.9B shows that during infusion, constant flow rate will match that necessary for DMSP analysis.

FIGS. 2.10A-2.10B show that dispersion of a sampled plug reduces the average concentration, potentially below the limits of detection for MS. In FIG. 2.10A, as a sampled plug enters a fluidic channel, a nonuniform velocity disperses the species axially. As the sampled plug advances through the channel, the concentration decreases according to theory developed by Taylor. If the sample is diluted too much, the concentrations will be below the limit of detection for mass spectrometry analysis. In FIG. 2.10B, the relationship is shown between mean concentration vs flow rate and effective diffusion coefficient vs flow rate in a 10 cm long, 25 um diameter capillary (representative results for illustration only). Low flow rates will result in lower dispersion rates but higher axial diffusion rates and slow transient response. In high flow rate regimes, Taylor dispersion will dilute the species at a rate higher than diffusion alone. Higher flow rates also decrease transit time from sampling to analysis, hence increasing DMSP transient response. Optimizing sampling geometry and sampling rates can ensure successful transfer of analyte from the bioreactor to the DMSP for analysis.

FIG. 2.11 provides localized DMSP analysis of 3 types of adherent (2D) cell types. The signatures of each cell type indicate that DMSP is capable of differentiating between the cells, although additional work is underway to identify specifically which molecules are detected.

FIG. 2.12 provides DMSP treated samples from a 2D cell culture of normal human lung fibroblasts in media containing 2% FBS. The similarities between near samples (first and third) and far (second and fourth) demonstrate that DMSP is capable of differentiating local and bulk samples. Importantly, localized sampling reveals a rich biological state, indicating that there is an increased amount of biomarker QAs found near cell membranes.

FIG. 3.1 provides representative spectra gathered from time point 6 (end of experiment) for MC3T3 cells. The top six spectra are three bulk and three local samples from an undifferentiated cell line, while the bottom 6 spectra are three bulk and three local samples from a differentiated cell line. Due to the visual similarities between the spectra, statistical analysis (PCA) was used to identify features most contributing to variation between the samples (i.e. quality attributes).

FIGS. 3.2A-3.2B provide principal component analysis (PCA) cluster plots for time points 5 and 6 of the undifferentiated cell group vs time points 5 and 6 of the differentiated cell group. In FIG. 3.2A, bulk sampling reveals minimal clustering. In FIG. 3.2B, localized sampling reveals clusters for the two groups, indicating that localized sampling is beneficial for detecting differences between the cells at each state.

FIGS. 3.3A-3.3B provide principal component analysis (PCA) cluster plots for the differentiated cell line at time points 1 and 2 versus time points 5 and 6. Cells were expected to begin differentiation between time points 3 and 4, with differentiation completed by time point 5. In FIG. 3.3A, bulk sampling does not exhibit any clustering. In FIG. 3.3B, with localized sampling, clusters are observed indicating that DSP can detect differences between undifferentiated and differentiated cell lines.

FIG. 3.4 provides a schematic of a prototype ion transfer capillary designed for the mass spectrometer. From top left, going counter clockwise: Top view of transfer capillary system, front view, side view, and isometric view. Ions are introduced at the front end of the tube labeled "ions in". The vacuum generated draws the ions through the tube and into the MS inlet.

FIG. 3.5 shows a comparison of direct infusion vs ion transfer infusion. The signal associated with cytochrome-c is completely recovered even with the interfacial ion transfer capillary, indicating this technology will not sacrifice sensitivity when integrated with DSP in a GMP environment.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of biochemistry, biology, flow dynamics, analytical chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for analysis systems that are configured to extract a fluid sample from a fluid (e.g., aqueous solution) in a reactor (e.g., bioreactor) at a first rate and then flow the fluid sample to a sensor system at a second rate to analyze the fluid sample. The sensor system can detect the presence and/or concentration of molecules (e.g., biomolecules such as biomarkers (e.g., metabolites, proteins, peptides, cytokines, growth factors, DNA, RNA, lipids) and cells of different types and cell properties, e.g., mechanical stiffness, etc.)). The data obtained can be used by a feedback control system to modify, as needed, the conditions in the reactor to enhance the productively of the reactor. The first rate and the second rate can be different to accommodate different conditions and requirements of various systems of the analysis system so that the analysis system can operate in real-time to enhance productivity of the reactor. The analysis system can include a separation/fractionation/trapping system and/or a mass exchanger to alter the components present in the fluid sample to be analyzed so that beneficial information about the fluid in the reactor can be obtained and used in the feedback control system.

The fluid samples can be obtained using a non-invasive, sterile, and highly localized sampling system so that inline and real-time analysis of the fluid sample can be achieved, which also allows for adjustments to the reactor to be made in real-time using the feedback control system. The analysis system is tunable in regard to fluid sample volume, rates of capture, and rates of flow within the system to enable transient analysis of complex chemical or biological systems in the reactor fluid. The analysis system is configured to provide highly time resolved pressure differential pumping for specific volume sampling at highly controllable flow rates, which are tunable for different time frames and a wide range of flow rates in different regions of the analysis system. The flow system of the analysis system can decouple the flow rate for extraction and flow rate into the sensor system, which is advantageous since a wide range of conditions for different systems.

When the reactor is a bioreactor, the analysis system is capable on continuous measurement of components in the fluid (e.g., biomolecules, intact cells, microcarriers including intact cells) in multiple localized regions. The fluid sample can be obtained at a rate suitable to obtain the desired concentration of the components and then, if needed, separate unwanted components (e.g., particles, debris, and the like) and condition the fluid sample to enhance the analytical detection of the components. The fluid sample can then be flowed to the sensor system at an appropriate rate for the particular analytical device. Results from the analysis can then be used by the feedback control system to adjust, as needed, the conditions in the bioreactor so that the desired results are achieved. This process can be repeated in an iterative manner over any desired time period.

Having described embodiments of the analysis system generally, additional details are now provided. The analysis system can include a flow system, a sampling system, a reactor, a sensor system, and a feedback control system. The analysis system can also optionally include an n-stage separation/fractionation/trapping system (also referred to as "separation system") and/or a mass exchanger. Components such as tubing and valves can interconnect the various systems, the reactor, and the mass exchanger to transport fluid samples throughout the analysis system. Reference is often made to the various systems, the reactor, and the mass exchanger being in "fluidic communication", which means that components such as tubing and valves known in the art can connect the various systems, the reactor, and the mass exchanger. While there is much detail regarding the interconnection of the various systems, the reactor, and the mass exchanger, not every conceivable variable is provided but one of skill would understand how to design and construct the interconnections.

In an aspect, the analysis system can be configured in a number of different ways some of which are shown and described in reference to FIGS. 1.1, 1.2A, 1.2B, and 1.3 below. In general, the flow system is in fluidic communication with the sampling system. The sampling system is in fluidic communication with the reactor. In this way, a fluid sample can be extracted from a fluid in the reactor and flowed at a first rate to the flow system. Then the fluid sample can be flowed at a second rate from the flow system to the sensor system. The fluid sample can be analyzed using the sensor system. The sensor system can include multiple types of analytical devices to analyze the fluid sample. In an aspect, multiple analytical devices can analyze the fluid sample in parallel or serially to generate information and data. The information and data produced by the sensor system can be provided to the feedback control system. The feedback control system can, if necessary based on the information and data, adjust one or more parameter or variables within the reactor to enhance or otherwise alter the conditions (e.g., pH, temperature, concentration of one or more components, introduce new components, and the like) in the reactor to produce desirable results. The analysis system can be operated in a continuous manner so that the reaction is operating at a desired performance level.

In another aspect, that system can include the n-stage separation/fractionation/trapping system. In one configuration, the n-stage separation/fractionation/trapping system can be in fluidic communication with the sampling system and the flow system so that the fluid sample flows from the sampling system to the n-stage separation/fractionation system and then to the flow system. In another configuration, the n-stage separation/fractionation/trapping system can be in fluidic communication with the flow system and the sensor system so that the fluid sample flows from the flow system to the n-stage separation/fractionation/trapping system and then to the sensor system. In any configuration, the system can be configured so that the fluid sample can be flowed through the n-stage separation/fractionation/trapping system multiple times prior to proceeding further in the system.

In addition, the system can include the mass exchanger. In one configuration, the mass exchanger can be in fluidic communication with the sampling system and the flow system so that the fluid sample flows from the sampling system to the mass exchanger and then to the flow system. In another configuration, the mass exchanger can be in fluidic communication with the flow system and the sensor system so that the fluid sample flows from the flow system to the mass exchanger and then to the sensor system. In any configuration, the system can be configured so that the fluid sample can be flowed through the mass exchanger multiple times prior to proceeding further in the system.

In another embodiment, the system can include the n-stage separation/fractionation/trapping system and the mass exchanger. In one configuration, the n-stage separation/fractionation/trapping system can be in fluidic communication with the sampling system and the mass exchanger, while the mass exchanger is also in fluidic communication with the flow system. The fluid sample flows from the sampling system to the n-stage separation/fractionation/trapping system, to the mass exchanger, and then to the flow system. In another configuration, the n-stage separation/fractionation/trapping system can be in fluidic communication with the flow system and the mass exchanger, while the mass exchanger is also in fluidic communication with the sensor system. The fluid sample flows from the flow system to the n-stage separation/fractionation/trapping system, to the mass exchanger, and then to the sensor system. In a further configuration, the n-stage separation/fractionation/trapping system can be in fluidic communication with the sampling system and the flow system, while the mass exchanger is in fluidic communication with the flow system and the sensor system. The fluid sample flows from the sampling system, to the n-stage separation/fractionation/trapping system, to the flow system, to the mass exchanger, and then to the sensor system. In any configuration, the system can be configured so that the fluid sample can be flowed through the n-stage separation/fractionation/trapping system and/or the mass exchanger multiple times prior to proceeding further in the system. In this and other configurations provided herein, multiple passes through the n-stage separation system and/or mass exchanger can be performed to improve the sample treatment (separation/fractionation/purification/conditioning) for improved performance (e.g., sensitivity, resolution, and selectivity of detection by the sensor system).

The fluid sample will be defined differently if it is flowed through one, both, or neither of the n-stage separation/fractionation/trapping system and/or mass exchanger, but the "fluid sample" will be analyzed by the sensor system regardless. For example, where the stage separation/fractionation/trapping system and mass exchanger are not present, the fluid sample is referred to as the "fluid sample." When only the n-stage separation/fractionation/trapping system is present in the analysis system, the fluid sample is referred to as the "separation/fractionation/trapping fluid sample" or the "separation fluid sample." When only the mass exchanger is present in the analysis system, the fluid sample is referred to as the "conditioned fluid sample." When both the n-stage separation/fractionation/trapping system and the mass exchanger are present in the system, the fluid sample after passing through the n-stage separation/ fractionation/trapping system is referred to as noted above but then is referred to differently (e.g., conditioned fluid sample) after it passes through the mass exchanger. Thus, even though reference will be made to "fluid sample" generally in many instances, reference to "fluid sample" is understood to include a fluid sample flowed through one, both, or neither of the n-stage separation/fractionation/trapping system and/or mass exchanger.

FIGS. 1.1, 1.2A, and 1.2B illustrate various configuration schematically. FIG. 1.1 illustrates an embodiment of the analysis system 10 of the present disclosure. The analysis system 10 can include a flow system 12, a sampling system 30, a reactor 40, a sensor system 50, and a feedback control system 60. The flow system includes a pump system 14 and a valve system 16. The pump system 14 and the valve system 16 can be two distinct components or a single component. The flow system 12 (e.g., the pump system 14 including a syringe pump) can be used to flow a fluid sample (e.g., which may contain components or chemicals of interest) from the fluid in the reactor 30. The pump system 14 can draw (cause the fluid to flow) the fluid sample via valve system 16 and sampling system 30. The sampling system 30 can include one or more sampling structures that can be inserted or placed adjacent or within the fluid in any x-, y-, and z-direction, such that the fluid samples from different sampling structures can interact (e.g., mix) or flow separately. The sampling system 30 can also be stationary and the reactor or the structure include the fluid is moved in the x-, y-, and z-direction to obtained the fluid sample form the desired three dimensional location in the fluid. The sampling structure can have dimensions and/or structures so that certain sizes of components or chemicals can be flowed into the sampling system 30. The valve system 16 can include one or more valves (e.g., two way valve) to direct the flow of the fluid sample.

Once the fluid sample is flowed to the flow system 12, the fluid sample may be stored (e.g., temporarily) or immediately directed to the sensor system 50. In an aspect, the fluid sample is flowed to the pump system 14 at a first flow rate and then flowed to the sensor system 50 at a second flow rate by the switching of the flow path using the valve system 16 (e.g., using a two way valve). The first flow rate and the second flow rate can be the same or different. In some instances the first flow rate may be much slower than the second flow rate based on the fluid (e.g., component(s) in the fluid, concentration of the component(s), conditions in the reactor, and the like). The second flow rate can be determined based on the configuration of the sensor system 50 and the analytical method of analyzing the fluid sample. Once the fluid sample is analyzed, the data can processed and used by the feedback control system 60 to adjust variables (e.g., add components or reactants, adjust pH, adjust temperature, and the like) in the reactor 40 to enhance the performance of the reactor 40.

FIGS. 1.2A and 1.2B illustrate embodiments of the analysis system 10A and 10B respectively that include an n-stage separation/fractionation/trapping system 70 and/or mass exchanger 80. FIG. 1.2A illustrates the placement of the n-stage separation/fractionation/trapping system 70 and/or mass exchanger 80 between the sampling system 30 and the flow system 12, while FIG. 1.2B illustrates the placement of the n-stage separation/fractionation/trapping system 70 and/or mass exchanger 80 between the flow system 12 and the sensor system 50. In an embodiment not illustrated, the n-stage separation/fractionation/trapping system 70 can be positioned between the sampling system 30 and the flow system 12 and the mass exchanger 80 can be positioned between the flow system 12 and the sensor system 50. In regard to the fluid sample, the sensor system 50 analyzes the fluid sample, whether that flow through one, both, or neither of the n-stage separation/fractionation/trapping system 70 and/or mass exchanger 80.

In regard to FIG. 1.2A, three configurations are provided and each will be discussed in terms of flow of the fluid sample. In the first configuration, the analysis system 10A includes only the n-stage separation/fractionation/trapping system 70. From the sampling system 30, the fluid sample flows into the n-stage separation/fractionation/trapping system 70 (a) and then to the flow system 12 (b). In the second configuration, the analysis system 10A includes only the mass exchanger 80. From the sampling system 30, the fluid sample flows into the mass exchanger 80 (d) and then to the flow system 12 (e). In the third configuration, the analysis system 10A includes both the n-stage separation/fractionation/trapping system 70 and the mass exchanger 80. From the sampling system 30, the fluid sample flows to the n-stage separation/fractionation/trapping system 70 (a), to the mass exchanger 80 (c), and then to the flow system 12 (e). In another configuration, the fluid sample can be flowed through the n-stage separation/fractionation/trapping system 70 multiple times flowing (x) flow path. In yet another configuration, the fluid sample can be flowed through the mass exchanger 80 multiple times flowing (y) flow path.

In regard to FIG. 1.2B, four configurations are provided and each will be discussed in terms of flow of the fluid sample. In the first configuration, the analysis system 10B includes only the n-stage separation/fractionation/trapping system 70. From the flow system 12, the fluid sample flows into the n-stage separation/fractionation/trapping system 70 (aa) and then to the sensor system 50 (bb). In the second configuration, the analysis system 10B includes only the mass exchanger 80. From the flow system 12, the fluid sample flows into the mass exchanger 80 (dd) and then to the sensor system 50 (ee). In the third configuration, the analysis system 10B includes both the n-stage separation/fractionation/trapping system 70 and the mass exchanger 80. From the flow system 12, the fluid sample flows to the n-stage separation/fractionation/trapping system 70 (aa), to the mass exchanger 80 (cc), and then to the sensor system 50 (ee). In the fourth configuration, the analysis system 10B includes both the n-stage separation/fractionation/trapping system 70 and the mass exchanger 80. From the sampling system 30, the fluid sample flows to the n-stage separation/fractionation/trapping system 70 (ff), to the flow system 12 (ff), to the mass exchanger 80 (dd), and then to the sensor system 50 (ee). In another configuration, the fluid sample can be flowed through the n-stage separation/fractionation/trapping system 70 multiple times flowing (xx) flow path. In yet another configuration, the fluid sample can be flowed through the mass exchanger 80 multiple times flowing (yy) flow path.

The reactor can be a chemical reactor or bioreactor. The reactor includes a fluid that includes one or more components (e.g., chemicals, biochemical, cells, microcarriers, and the like). The reactor includes at least one chamber in which the fluid is present. The reactor may also include other chambers for storing reactants and other agents that can be used in the fluid. The reactor may also include devices for flowing the reactants and other agents in the reactor as well as devices for removing reactants and other agents or other bi-products. The reactor can include pH and temperature measuring devices to monitor and control the conditions in the fluid and outside of the fluid. The reactor can be a bioreactor that can be used to grow cells, where the cells or products produced from the cells can be used in technologies such as therapeutics. An embodiment using a bioreactor is discussed in Examples 1 and 2. Examples of systems to which the platform is applicable span a range of industries. Some possible industrial applications include pulp/paper, food/agricultural processing, fossil fuel/plastics production, perfume/personal hygiene, pharmaceuticals, etc. where aqueous samples can be analyzed to provide insight to processing parameters and final product quality. A subset of potential applications in the biological space that the system can provide insight to include raw materials analysis (e.g. cell culture media, donor material, chemicals), 2D and 3D cell cultures for therapeutic cell manufacturing or research applications, antibody/antigen manufacturing (e.g. CHO cells), biologics manufacturing, tissue engineering (e.g. tissue engineered medical products or TEMPs), medical diagnostics (e.g. blood/urine/saliva analysis), etc. The platform may also provide diagnostics for environmental monitoring, drug testing, and contamination detection.

The reactor can be used in chemical, biochemical, or biological applications. In a particular embodiment, the reactor is a bioreactor and the fluid can include an aqueous solution of biomolecules, intact cells, microcarriers including intact cells, and a combination thereof. The biomolecules can include one or more of secretome, metabolome, transcriptome, genome, lipidome, as well as component found in cytoplasm or components found upon lysing a cell. In particular, the biomolecules can include proteins, peptides, nucleotides, DNA, RNA, sugars, proteases, growth factors, chemokines, cytokines, adhesion molecules, fatty acids, lipids, amines, co-factors, organic acids, polysaccharides, metabolites, and the like. One or more types of biomolecules (e.g., metabolites, cytokines, and the like) can be used as quality control indicators, which can be monitored and used in the feedback loop for the feedback control system.

The flow system functions to transport (e.g., flow) the fluid sample throughout the analysis system. The flow system can flow the fluid sample at different rates in different regions of the analysis system. For example, the flow system can cause the fluid sample to flow at a different rate from the reactor to the flow system relative to the rate from the flow system to the sensor system. The ability to operate at different rates is advantageous in extracting the fluid sample and flow to the flow system at a relatively slower rate as compared to the rate of flow of the fluid sample to the sensor system since a larger amount of low concentration components can be extracted under slower extraction rates. The dimensions of the components in the flow system and components interconnecting the various systems, the reactor, and the mass exchanger are such that they can effectively transport fluid samples of the volume of 1 nL to 100 mL. The system can effectively transport fluid samples of a volume, which is determined by the size of the pump and tubing used but in general can range from about 1 nL to 100 mL.

The flow system can include a pump system and a valve system. The pump system and valve system can be integral to one another or can be separate components. The pump system can include a syringe pump, piezoelectric pump, peristaltic pump, centrifugal pump, positive displacement pump, rotary pump, diaphragm pump, or capillary suction pump. For example, a KDS Scientific Legato 270 syringe pump can cause a fluid sample of about 1 pL to 100 mL to flow through the analysis system. The syringe size can be varied so the will also vary and can be selected as desired. In an example, the flow system includes a 0.5 µL syringe is capable of 3.06 pL/min while a 140 mL syringe is capable of up to 215 mL/hr. Other pump types and sizes can be used, as can be envisioned by one of skill in the art. The valve system can be multi-way valves such as a two way valve. For example, in a first configuration, a two way valve directs the flow of the fluid sample from the reactor to the pump system and in a second configuration, the two way valve directs the flow of the fluid sample to the sensor system. The pump system and/or the valve system can be operated manually and/or by a computer system.

FIG. 1.3 illustrates a section of the analysis system 10 that depicts the flow system 12 and the sensor system 50. The section shown in FIG. 1.3 can be applied in each embodiment as shown in FIGS. 1.1, 1.2A, and 1.2B. The flow system 12 includes a pump system 14 and valve system 16 and the fluid sample is flowed into the valve system 16. From the valve system 16, the fluid sample is flowed to the pump system 12 (g). In one option, the fluid sample can then flow from the pump system 12 to the valve system 16 (h) and to the sensor system (i), directly or indirectly (e.g., via the n-stage separation/fractionation system 70 and/or the mass exchanger 80). In another option, the fluid sample can flow to the sensor system 50 bypassing the valve system 16 (j), directly or indirectly (e.g., via the n-stage separation/fractionation system 70 and/or the mass exchanger 80).

The sampling system is configured to extract the fluid sample from the fluid in the reactor in a controlled manner in regard to position in the x-, y-, and z-dimensions. For example, the sampling system includes a control system to position an extraction element is a desired location (e.g., position in the reactor fluid, depth of fluid, and relative position to microcarriers and/or intact cells. Various configuration are shown in FIGS. 1.4A-1.4C. The extraction element can be a needle, tube, capillary tube, straw, porous flow structure, or the like. The extraction element can be dimensionally configured to extract the fluid sample. The extraction element can be dimensionally configured to extract the fluid sample comprising a microcarrier including one or more intact cells. For example, the inner diameter of the extraction element can be about 100 µm to 1 mm for microcarriers. In another aspect, the extraction element can be dimensionally configured to extract the fluid sample comprising an intact cell and biomolecules but excluding microcarriers. For example, the inner diameter of the extraction element can be about 10 µm to 100 µm for an intact cell. In another example, the inner diameter of the extraction element can be about 100 nm to 10 µm so that biomolecules are extracted but microcarriers and/or intact cells are excluded. In addition, the extraction element can include a filter or other components to limit what is extracted in the fluid sample.

In another aspect, the sampling system could be designed to immobilize (e.g., have an initial diameter that allows in an object and then the diameter narrows) an analyzed object (e.g., a microcarrier with incorporated cells or an individual cell) at the sampling system orifice or at a point just past the orifice in contact with fluid in the reactor such that an extracted fluid sample in contact with an analyzed object is enriched in target molecules. In one aspect of this configuration, a sensor such as capacitive or conductive probe or a mechanical resonators or a pressure transducer or an optical sensor can be used to detect when an analyzed object is immobilized.

FIGS. 1.4A-1.4C illustrate three embodiments in how the sampling system 30 extracts the fluid sample from the reactor. FIG. 1.4A illustrates the use of an extraction element 102 that includes an orifice 104 having a diameter to limit the components present in the fluid sample. The extraction element 102 is placed into the fluid 110 to extract a fluid sample including biomolecules 116 such as secretome, metabolome, genome, lipidome, or combinations thereof whereas intact cells 114 and microcarriers 12 are excluded due to the dimensions of the extraction element 102. FIG. 1.4B illustrates the use of the extraction element 102 that includes the orifice 104 having a diameter to limit the components present in the fluid sample but the extraction element 102 is disposed adjacent a microcarrier or an intact cell. As a result, the extraction element 102 can extract a fluid sample including biomolecules 116 such as secretome, metabolome, genome, lipidome, or combinations thereof adjacent intact cells 114 and microcarriers 112, while the intact cells 114 and microcarriers 112 are excluded due to the dimensions of the extraction element 102. FIG. 1.4C illustrates the use of an extraction element 102a that includes a larger diameter extraction element 102a to extract microcarriers 112 and intact cells 114. As a result, the extraction element 102a can extract a fluid sample including biomolecules 116 such as secretome, metabolome, genome, lipidome, or combinations thereof and intact cells 114 and microcarriers 112. Although not shown, the diameter of the extraction element can be designed to extract intact cells and biomolecules while excluding microcarriers.

The sensor system can include an analytical device that can be used to analyze the fluid sample. The sensor system can include multiple analytical devices and appropriate interfaces to accept the fluid sample so that it can be analyzed. It may be desirable to analyze a fluid sample using two or more analytical devices, in which case the fluid sample can be divided between or among the analytical devices and analyzed. The sensor system can include one or more analytical devices such as: ESI-MS, Raman Spectrometer, FTIR Spectrometer, UV-VIS Spectrometer, ESEM/SEM, Optical Microscope, Fluorescence Microscope, NMR, Electrochemical Redox and/or Impedance Sensor, Flow Cytometer, and Acoustic Transducer. An embodiment using the ESI-MS is discussed in Examples 1 and 2.

The feedback control system is in communication with the sensor system and the reactor system (and optionally the pump system) so that electronic information (e.g., data, commands, and the like) can be communicated back and forth. The feedback control system is configured to use the output (e.g., data, information, and the like) of the sensor system to modify conditions of the reactor. The output can be analyzed (e.g., using a computer system) by the sensor system and/or the feedback control system. The sensor system can analyze the components (e.g., biomolecules) present or absent in the fluid sample as well as the concentration of the components. One or more of the biomolecules can be a quality control indicator, which might be of particular interest as the quality control indicator(s) may provide significant insight into the conditions, reactions, processes, and the like present in the fluid at any point in time. The analysis system is advantageous in that the components such as quality control indicator biomolecules can be analyzed as a function of time with minimal disturbance to the reactor and the conditions, reactions, processes, and the like can be adjusted in real-time to enhance the performance of the reactor.

The separation/fractionation/trapping system can be configured to separate a first group of components from the fluid sample to produce a separated/fractionated fluid sample. The first group of components can include the biomolecules, intact cells, and microcarriers. Components that are separated from the first group of components can include debris from reactions, cells, microcarriers and particles such as precipitated particles, vesicles, exosomes, organelles, cell nuclei, and combinations thereof. The separation/fractionation/trapping system can include one or more stages, where each stage can include the same or different separation or fractionation devices. Each stage can target separating the same component or one or more stages can separate different components in an iterative manner. The separation or fractionation device can include size selection filtration or fractionation device, adsorption/adsorption device, dialysis or reverse dialysis device, partition chromatography device, electrophoresis device, floatation/sedimentation device, fluid trapping device, centrifugation devices, or the like.

The mass exchanger can be configured to condition the fluid sample (e.g., separated/fractionated fluid sample) to produce a conditioned fluid. The conditioning can include removing unwanted components present in the fluid sample (e.g., remove or reduce the amount of components that can interfere detection of the desired signal such as salts which can inhibit mass spectrometry signals), retaining relatively larger components such as biomolecules as compared to smaller components (e.g., small organic molecules), and introducing signal enhancing components, which may lower the detection limit, improve signal to noise ratio, shift charge distributions to mitigate effects of unwanted components, and the like. The conditioning fluid can be aqueous. In regard to mass spectrometry, the conditioning fluid may include organic acids such as acetic acid, trifluoroacetic acid (TFA), formic acid, etc (e.g., 0% to 100%), which can aid in protonation of biomolecules, for example. The conditioning fluid can also include one or more of the following: ammonium acetate (e.g., 0% to 100%), m-NBA (e.g., 0% to 100%), propylene carbonate (e.g., 0% to 100%), ethylene carbonate (e.g., 0% to 100%), sulofane (e.g., 0% to 100%), and organic solvents such as methanol, acetonitrile, isopropyl alcohol (IPA), chloroform, acetone, N-methyl-2-pyrrolidone (NMP), etc. (e.g., 0% to 100%), chemical standards (i.e. to reduce instrument drift and enable quantitative analysis), and a combination thereof. The ammonium acetate can increase the acidity in the electrospray plume, enhance protonation, and/or reduce formation of salt adducts. m-NBA can increase the charge state in non-denaturing fluid samples. Methanol, and other organic solvents, can be used to selectively remove biomolecules with preferential solubility in the organic solvent and also to shift the charge state distribution of larger biomolecules like proteins through denaturing and unfolding effects on the molecule. In the case of inline HPLC or direct ESI-MS analysis, chemical standards can be added to the conditioning flow to help with quantification of sample concentration and accurate mass identification.

Other analytical techniques such as NMR (nuclear magnetic resonance), FTIR (Fourier transform infrared spectroscopy), and SEM (scanning electron microscope) imaging may require different sample treatments. For instance, for NMR analysis will benefit from the bulk exchange of water with deuterium oxide ($D_2O$) for enhanced detection of molecules overlapping in this region of the spectra as well as internal standard (e.g. tetramethylsilane or TMS, 4,4-dimethyl-4-silapentane-1-sulfonic acid or DSS, trimethylsilypropanoic acid or TSP) infusion for exact NMR reference. The same type of exchange will enable FTIR which faces challenges in highly aqueous solutions. Exchanging less volatile liquids into the sample, such as ethylene glycol, will ensure that freezing and or evaporation do not occur during SEM imaging. Other possible sample treatments and analysis techniques can be envisioned by one of skill in the art.

The mass exchanger can include two or more flow channels and one or more selectively permeable membrane, wherein the selectively permeable membrane are adjacent one or more of the flow channels. In an aspect, the mass exchanger includes a first flow channel having a first flow channel entrance and a first flow channel exit. In addition, the mass exchanger includes a second flow channel having a second flow channel entrance and a second flow channel exit. The first flow channel and the second flow channel can be separated from one another by a selectively permeable membrane. As fluid flow through the flow channels, the fluids in each flow channel are in fluidic communication with the selectively permeable membrane.

The material defining the first flow channel and the second flow channel can be made of a polymer, ceramic, glass, silicon, plastic, or polyamide, metal, or PDMS. Each flow channel can have a height of about 1 µm to 1 mm and a width of about 1 µm to 10 mm. The first flow channel and the second flow channel can be adjacent the selectively permeable membrane for a length of about 100 µm to 100 mm.

The selectively permeable membrane functions to separate unwanted components in the fluid sample from those of interest and/or to cause the introduction of components to the fluid sample to enhance detectability. The selectively permeable membrane can be made of material such as aluminum oxide (anodized porous alumina), polymers (e.g. track etch membranes), cellulose, and zeolite, porous metal (e.g., nanoporous copper), porous graphene and graphene oxide. The selectively permeable membrane can be made of or coated with a material that aids the formation of conditioned fluid sample. For example, the selectively permeable membrane can be made of or coated with a hydrophobic material/hydrophilic material, lipophilic material/lipophobic material, inert material, decorated with selectively (positively or negatively) charged chemical compounds, electrically conducting, semiconducting or insulating material, and combinations thereof. The selectively permeable membrane can have a porosity of about 5% to 95%. The selectively permeable membrane can have a thickness of about 1 nm to 10 µm, a length of about 10 µm to 50 mm, and a width of about 10 µm to 10 mm.

In an aspect, the mass exchanger is configured to flow the fluid sample flow through the first flow channel from the first flow channel entrance to the first flow channel exit and be in fluid communication with the selectively permeable membrane. In addition, the mass exchanger can be configured to flow a conditioning fluid through the second flow channel from the second flow channel entrance and the second flow channel exit and be in fluid communication with the selectively permeable membrane, where the sample fluid and the conditioning fluid are in communication through the selectively permeable membrane. Although here as well in other embodiments the flow of the fluid sample and the conditioning fluid are in the same direction, the fluid flow can be change so the two flow counter to one another or across one another.

In another aspect, the mass exchanger includes a first flow channel having a first flow channel entrance and a first flow channel exit, a second flow channel having a second flow channel entrance and a second flow channel exit, and a third flow channel having a third flow channel entrance and a third flow channel exit. The first flow channel and the second flow channel are separated from one another by a first selectively permeable membrane, while the third flow channel and the second flow channel are separated from one another by a second selectively permeable membrane. The mass exchanger can be configured to flow the fluid sample through the second channel, while also being configured to flow a first conditioning fluid through the first flow channel and to flow a second conditioning fluid through the third flow channel. The flow of the fluid sample relative one or both of the first conditioning fluid and the second conditioning fluid can be an in-line flow, a counter flow, or a cross flow with different relative angle of orientation between different sample and conditioning fluid channels.

In another embodiment, the mass exchanger includes the first flow channel having the first flow channel entrance and the first flow channel exit. The first flow channel also include a trapping chamber, where the trapping chamber is dimensionally configured to trap one or more microcarriers or cells. The first flow channel can be configured to lyse the cells of the microcarriers or the cells, where the contents (e.g., biomolecules on the cell, microcarrier, or in the cytoplasm) flow through the remainder of the first flow channel and are in fluidic communication with the selectively permeable membrane. The lysing can be achieved using devices that can perform electroporation, chemical digestion, mechanoporation, sonoporation, and thermoporation, osmotic stressing or a combination thereof. Depending upon the lysing technique used, one or more components of the lysing device can be positioned at one or more locations or positioned in the mass exchanger to achieve lysing.

In yet another example, the mass exchanger includes a first flow channel having a first flow channel entrance and a first flow channel exit, a second flow channel having a second flow channel entrance and a second flow channel exit, and a third flow channel having a third flow channel entrance and a third flow channel exit. The first flow channel and the second flow channel are separated from one another by a first selectively permeable membrane, while the third flow channel and the second flow channel are separated from one another by a second selectively permeable membrane. The mass exchanger is configured to flow a first conditioning fluid through the first flow channel and flow a second conditioning fluid through the third flow channel. The second flow channel further includes the trapping chamber such as that described above and herein, where the components generated from lysing flow through the remainder of the first flow channel and are in fluidic communication with the first selectively permeable membrane and the second selectively permeable membrane.

Having described embodiments in general, additional detail regarding various embodiments are now provided. FIG. 1.5A illustrate embodiments of the mass exchanger 200a. The mass exchanger 200a include a first channel 202, a second channel 204, and selectively permeable membrane 206 disposed between the first channel 202 and the second channel 204. The first channel 202 includes an inlet 202a and an exit 202b where the fluid sample flows along path (q). The second channel 204 includes an inlet 204a and an exit 204b where the fluid sample flows along path (r) (in-line with flow (q)) or along path (s) (counter flow to (q)).

FIG. 1.5B illustrate embodiments of the mass exchanger 200b. The mass exchanger 200b include a first channel 212, a third channel 215, a first selectively permeable membrane 216a disposed between the first channel 212 and the third channel 215, a second channel 214, and a second selectively permeable membrane 216b disposed between the third channel 215 and the second channel 214. The third channel 215 includes an inlet 215a and an exit 215b, where the fluid sample flows along path (qq). The first channel 212 includes an inlet 212a and an exit 212b where the fluid sample flows along path (rr) or (ss), one of which may be in-line with path (qq) and the other counter flow to (qq). The second channel 214 includes an inlet 214a and an exit 214b where the fluid sample flows along path (rr') or (ss'), one of which is in-line with flow (qq)) and the other counter flow to (qq).

FIG. 1.6A illustrate embodiments of the mass exchanger 200c. The mass exchanger 200c include a first channel 222, a second channel 224, and selectively permeable membrane 226 disposed between the first channel 222 and the second channel 224. The first channel 222 includes an inlet 222a and an exit 222b where the fluid sample flows along path (t). The first channel 222 also includes a trapping chamber 222c to trap a microcarrier or intact cell, where the trapping chamber 222c has dimensions according to the size of the microcarrier (e.g., diameter of microcarrier of about 25 to 500 µm) or intact cell (e.g., volume of intact cell of about 0.5 µm to 200 µm) of interest. Although not shown, the first channel 222 can include components to assist in lysing the cells on the microcarrier or the intact cell, where the components are particular to the lying technique and positioned accordingly within the first chamber 222 and/or the trapping cell 222c. The second channel 204 includes an inlet 204a and an exit 204b where the fluid sample flows along path (r) (in-line with flow (q)) or along path (s) (counter flow to (q)).

FIG. 1.6B illustrate embodiments of the mass exchanger 200d. The mass exchanger 200d include a first channel 232, a third channel 235, a first selectively permeable membrane 236a disposed between the first channel 232 and the third channel 235, a second channel 234, and a second selectively permeable membrane 236b disposed between the third channel 235 and the second channel 234. The third channel 235 includes an inlet 235a and an exit 235b, where the fluid sample flows along path (tt). The third channel 235 also includes a trapping chamber 242 to trap a microcarrier or intact cell, where the trapping chamber 242 has dimensions according to the size of the microcarrier (e.g., diameter of about 25 to 500 µm) or intact cell (e.g., volume of about 0.5 µm to 200) of interest. Although not shown, the third channel 235 can include components to assist in lysing the cells on the microcarrier or the intact cell, where the components are particular to the lying technique and positioned accordingly within the third channel 235 and/or the trapping cell 242. The first channel 232 includes an inlet 232a and an exit 232b where the fluid sample flows along path (uu) or (vv), one of which may be in-line with path (tt) and the other counter flow to (tt). The second channel 234 includes an inlet 234a and an exit 234b where the fluid sample flows along path (uu') or (vv'), one of which is in-line with flow (tt)) and the other counter flow to (tt).

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Emerging cell therapies have been shown to successfully treat a range of life threatening illnesses and injuries. The technologies enabling cell therapies can be also used to develop new drugs, and can serve as models for in vitro studies, but are currently not widely available.[1-7] In order to enable large scale and cost effective adaption of cell therapies, quality control methodologies and standards for therapeutic cell manufacturing need to be established.[1, 8-10] During the production of therapeutic cells, levels of metabolites,[11] cytokines[12-14] and other proteins[15] or biomolecules can be monitored as quality control indicators (QCIs) directly related to cell health, efficacy, and differentiation. Since potential QCIs span a range of molecular weights, are different for different cell types, and are present in widely varying concentrations, an effective QCI discovery and quality control tool should enable sensitive, untargeted identification and dynamic (transient, spatially resolved) detection of the diverse biomolecules, regardless of molecule size and abundance within a sterile bioreactor environment.

Current online methods for continuous monitoring of therapeutic cell cultures, such as pH measurement, temperature measurement, off-gas mass spectrometry, infrared and near infrared spectroscopy, and Raman spectroscopy non-invasively capture bulk characteristics, but are subpar in offering detailed information such as the secretome's complete biochemical composition or spatial heterogeneity within the bioreactor.[16] Some progress has been made in the implementation of non-invasive technologies that deliver multi-dimensional information about the cell population in a bioreactor. For instance, advanced image processing techniques have been developed that provide the ability to non-invasively track and monitor cell growth, measuring cell count and distribution on microcarriers in a bioreactor.[17] Similarly, two-photon microscopy using endogenous fluorophores has been demonstrated to be capable of monitoring stem cell differentiation.[18] While these methods are non-destructive and provide bioreactor status information that helps maintain a viable environment for cell growth, they provide only partial information important to predicting cell health and efficacy.[16, 19] As of yet, the level of quantitative detail required for high fidelity QCIs has only seemed obtainable via offline methods such as LC-MS,[15] microarrays,[20] and enzymatic assays,[16, 21] which have been the main workhorses in characterization of bioreactor processes and biomarker discovery; however, offline methods suffer from significant time delays and low throughput which limits their utility for online reactor monitoring. Bringing the power of MS analysis to online diagnostics of the complex biochemical environment of bioreactors is thus the main motivation for this work, which brings together the advances in microfabrication and packaging with an innovative approach to rapid sample preparation in microfluidic format to enable dynamic ESI-MS analysis of biomarkers from the native environment of cell bioreactors.

Electrospray ionization mass-spectrometry (ESI-MS) is an excellent candidate for biochemical analysis due to its broad molecular weight coverage and capacity for unlabeled biomolecule detection and discovery. ESI-MS preserves the state of large biomolecules ("soft ionization") with no fragmentation, requires no a priori labeling of biomolecules, and is very sensitive to low concentrations of chemicals (limits of detection in the nanomolar to even picomolar range).[22] However, direct online ESI-MS of cell media is plagued by sample preparation challenges,[23] imposing the requirement on an online sampling approach for ESI-MS to rapidly treat samples, removing compounds incompatible with MS and modifying the sample composition such that ESI-MS analysis is possible. Key requirements for an effective on-line ESI-MS bioreactor monitoring tool include spatially and temporally resolved sampling of reactor samples. The ideal online monitoring device should have a localized (~cell size) sampling domain (i.e., small inlet) to detect spatial heterogeneity, and this inlet should be easily incorporated with multiple bioreactor types, e.g., roller bottles, stirred suspensions, wave type, rotating wall, parallel plate, fixed and fluidized bed, continuous flow, etc.[24,25,26] The Dynamic Mass Spectrometry Probe (DMSP) (FIG. 2.1) is a monolithic cell-bioreactor monitoring tool, which as demonstrated in this work, has the ability to rapidly condition and analyze representative cell-bioreactor mixtures via online ESI-MS, and is therefore an important contribution to the suite of methods useful for cell therapy quality control indicator discovery and monitoring.

Dynamic Mass Spectrometry Probe (DMSP) Design

The DMSP (Dynamic Mass Spectrometry Probe) is a continuous flow, spatially resolved, biochemical sampling platform capable of detecting low concentration biomolecules in ~1 minute. The device is comprised of three elements (FIG. 2.1): 1) a sampling inlet, which can be easily interfaced with most pumps and cell-bioreactors; 2) a microfabricated mass exchanger which simultaneously removes compounds not amenable to MS analysis, such as inorganic salts, and infuses compounds from the active conditioning stream that enhance MS analysis, e.g. acids for protonation[27], and supercharging molecules for enhanced sensitivity[28]; and, 3) a nano-electrospray ionization emitter for direct infusion to the mass spectrometer for quantitative/qualitative analysis.

The DMSP mass exchanger is microfabricated and subsequently interfaced with an inlet capillary made from PEEK with a 360 µm outer diameter and a 150 µm inner diameter (IDEX Health and Science) and an outlet (for ESI-MS) of fused silica with a 360 µm OD, 75 µm ID, and a 30 µm tapered outlet (New Objective, Inc.). The microfabricated mass exchanger consists of a 200 µm wide×5 µm tall sample channel that runs between the inlet/outlet capillaries. The sides of the sample channel are defined by SU-8 3005, a biocompatible photoresist.[29] Above the sample channel is a nanoporous alumina membrane which inhibits the diffusion of larger biomolecules of interest but allows free diffusion of mass spectrometry interfering species, such as inorganic salts, into the high flow rate active conditioning channel. The bottom of the sample channel is defined by a 3 µm $SiO_2$ deposited on top of the silicon base wafer. The microfabrication processes (FIG. 2.2) are carried out on 500 µm silicon wafers which provide structural support during fabrication and device operation. DMSP's active sample conditioning allows for the modification of a biological sample in three ways. 1) By removing unwanted components (labeled "interference removal", FIG. 2.1) such as salts which inhibit MS analysis; 2) By retaining comparatively large biomolecules (proteins, peptides, metabolites) which are target quality control indicators (QCIs) of cell culture state; and 3) By introducing MS signal enhancing molecules (labeled "conditioning exchange", FIG. 2.1), such as supercharging agents, that lower the limit of detection, improve the signal to noise ratio, and shift the charge state distributions to further mitigate the effect of parasitic salt interference in MS analysis. Using microdialysis, salts are removed from the sample preferentially to large biomolecules due to disparity between the respective species' diffusion coefficients, and hence the rate of diffusion of the different size molecules from the sample channel into the active sample conditioning channel[30] Some of the target biomolecules are lost during sample treatment due to parasitic cross-over, but with a reduction in pore diameter within the membrane separating the sample and active conditioning channels, the selectivity of DMSP can be further enhanced to expand the range of molecular weight of retained target biomarkers without sacrificing the effectiveness of the salt removal.[30]

Examples of Different Modes of DMSP Operation and Effectiveness

DMSP "Active" Sample Conditioning

Active sample conditioning enhancement of ESI-MS analysis was explored through comparison of the effect of four different active conditioning solutions. The MS spectra in FIG. 2.3 indicate the effect of DMSP treatment depending on the composition of the conditioning solution. All four conditioning channel solutions contain 1% acetic acid (AA) to facilitate the protonation of target biomolecules[27]. Three of the conditioning solutions contain additional compounds that have been shown to improve ESI-MS analysis. Ammonium acetate has been reported to increase the acidity in the electrospray plume, enhancing protonation,[31] and to reduce the formation of salt adducts.[32, 33] Supercharging molecules can also improve sensitivity. In particular, m-NBA (in concentrations from 1-20%) has been shown to increase charge state distribution in non-denaturing solutions. Although the mechanism is not completely settled, it seems that supercharging occurs due to the low volatility and low surface tension of the super charging agent, a combination that promotes the Coulombic droplet fission process.[28, 34] Finally, methanol (MeOH) is a common ESI-MS solvent which can shift charge state distribution due to a denaturing, or unfolding, of biomolecules, revealing more locations for protonation vs. the molecule in its natural folded state.[35]

A solution of 100 mM KCl with 5 µM cytochrome-c was used to carefully characterize the effect of active sample treatment using the four conditioning solutions. In order to maintain relevance for cell manufacturing, the salt level is similar to that expected in a bioreactor[36], and cytochrome-c is an appropriate model protein in the mass range (~12 kDa) of signaling molecules secreted from cells, such as cytokines, that are expected to be key quality indicators for cell health.[12-14, 23] FIGS. 2.3A-2.3E shows the effect that each of the four sample treatments has on the resulting mass spectra. When untreated, the spectra obtained for ESI-MS of 100 mM KCl with 5 µM cyt-c (FIG. 2.3A) has no peaks associated with cyt-c, indicating that the added KCl levels are high enough to form adducts and clusters that render MS analysis incapable of identifying the protein—this is indicative of how the environment of a cell bioreactor will mask biomolecule signals in direct ESI-MS analysis, and motivates the need for online sample treatment. In the presence of even moderate salt content, adduct formation of analyte molecules makes identification challenging to impossible, and also reduces signal intensity, as does charge competition due to cluster formation. Salt concentrations need to be reduced to below about 1 mM for identification of cytochrome-c at a concentration of 5 µM, therefore at least 99% of the KCl in the solutions tested here was removed in order to produce these spectra. In cell monitoring applications, analyte concentrations could be lower than 5 µM which is why a highly selective mass exchanger, such as DMSP, is necessary to remove salt while retaining biomolecules of interest.

Combined removal of salt and introduction of acetic acid for improved protonation results in a mass spectra characteristic of uncontaminated cyt-c (FIG. 2.3B). The most intense peak (m/z~1374) is due to cyt-c molecules charged via addition of nine protons (called the +9 charge state). The appearance of cyt-c spectral peaks in online analysis of a high salt solution occurs as a result of several mechanisms. Firstly, the removal of salt reduces adduction of the protein, so that the protein is charged via protonation. Salt removal also eliminates the formation of cluster peaks, reducing charge competition and corresponding signal suppression. Secondly, addition of AA into the sample via active sample treatment further increases the rate of protonation due to the increased $H^+$ concentration.

Adding 40 mM ammonium acetate to the conditioning solution increases the intensity of the largest cyt-c associated peak~$10^5$ (FIG. 2.3B, 1% AA treatment) to ~$10^6$, with no shift in charge state distribution (FIG. 2.3C). Ammonium acetate is often added in HPLC-MS workflows as a buffer, and has been shown to result in acidification of droplets produced via electrospray ionization and thus provide additional protons for analyte charging.[31] While addition of ammonium acetate further enhances protonation and mitigates salt adducts,[33] because ammonium acetate does not change the surface tension and has little to no denaturing effect on the protein so there is no apparent impact on the charge state: changes in MS spectra peak intensities are due to enhanced protein protonation with simultaneous suppression of salt adduction.

In contrast, adding supercharging molecule m-NBA at 2% to the conditioning flow results in a significantly shifted charge state distribution (FIG. 2.3D). What this means is that the protonated peak with 15$H^+$ attached to the biomolecule is most dominant, at about m/z 824. Although not producing the same maximum peak intensity as ammonium acetate, m-NBA causes a marked increase in the prevalence of spectral peaks corresponding to the highly charged protein. This suggests the possibility of using online m-NBA treatment for higher molecular weight proteins that would usually be outside the range of a given mass spectrometer. For instance, the Bruker MicroTOF used in these experiments has a maximum m/z range of 30-5000. Thus increasing the maximum charge placed on proteins from 10 to 20, for example, would raise the size of the largest detectable protein from 50 kDa to 100 kDa. The impact of supercharging is also seen in the potential for improved sensitivity. This is because tuning the ion transfer voltages in a mass spectrometer to acquire signals over the entire available m/z range sacrifices sensitivity compared to that obtainable when tuned for a smaller m/z range. As seen in FIG. 2.3D, super charging compresses the range of m/z values for peaks for cyt-c.

Addition of 50% methanol (MeOH) also has a significant effect on the charge state distribution (FIG. 2.3E) although the reason is different than in supercharging with m-NBA. This treatment creates a spectra in which the +14 charge state is most abundant, which suggests that the effects of m-NBA and MeOH are not identical. Methanol denatures the protein, revealing more sites for protons to attach, which results in a shift to higher charge state distributions. Although MeOH, similarly to m-NBA, has a lower surface tension than water, it is more volatile than water. Therefore it does not produce the same increase in droplet fission events that m-NBA does.[28, 35] Due to a lower solubility limit of inorganic salts within methanol,[37] continuous flow analysis was difficult using MeOH as an active conditioner. As MeOH was exchanged into the sample, salt precipitates would form. These precipitates eventually clogged the sample channel or the ESI emitter, causing the DMSP to cease operation.

SNR and LOD Improvements via DMSP Treatment

The experimental results depicted in FIGS. 2.3A-2.3E show how online DMSP treatment affects the ESI-MS analysis of a high salt content mixture in a qualitative manner, by comparing the charge state distributions and signal intensities. In FIGS. 2.4A-2.4C we present the impact of DMSP operation quantitatively by studying the signal to noise ratio (SNR) and limit of detection (LOD). The comparison of active conditioning solution on SNR and LOD was performed with two conditioning solutions of 1% AA alone versus 1% AA with 2% m-NBA for varying cyt-c concentration (0.25, 0.5, 1.0, 2.5, 5, and 10 µM) in 50 mM KCl solution. These experiments were designed to investigate how supercharging molecules specifically can enhance detection of proteins at low concentrations. FIGS. 2.4A-2.4C shows that the addition of 2% m-NBA to 1% AA in the conditioning solution both increases SNR and improves LOD for direct infusion nanoESI-MS through application of DMSP. FIG. 2.4A illustrations that the addition of m-NBA to the active conditioner increases SNR across multiple charge states. Here, signal to noise ratio is defined as $SNR = I_{cyt-c}/I_{avg}$, where the $I_{cyt-c}$ is the intensity (%) of an identified cyt-c peak and $I_{avg}$ is the averaged intensity (%) of all peaks within a window+/−0.3 m/z of the identified peak. This definition gives a local SNR value for every protonated cyt-c peak. An SNR above 2.5 corresponds to a distinguishable, fully protonated cyt-c peak. In FIG. 2.4A the highest and fifth highest SNR charge state are plotted as a function of cyt-c concentration. Supercharging molecule m-NBA is known to shift to higher charge state distributions, but these results demonstrate that it also increases the SNR for detected molecules across multiple charge states. This will allow for easier identification of low concentration biomolecules in complex mixtures.

For concentrations below 2.5 µM the addition of m-NBA to the active sample conditioner allows for the successful identification of multiple peaks associated with cyt-c. At low concentrations, 1% AA treatment alone does not allow detection of cyt-c, which means that the addition of m-NBA during treatment does more than shift the charge state distribution; it has a useful application in aiding in detection of biomolecules by enhancing protonation, and mitigating the effect of parasitic adducts formed with salt ions, thus lowering the limit of detection with DMSP analysis.[34, 35, 38] Adding m-NBA to the conditioning solution drastically improves the LOD (i.e., the lowest concentration for which SNR of a peak associated with fully protontated cyt-c is greater than 2.5) for cyt-c in 50 mM KCl by an order of magnitude, from 2.5 µM to 250 nM. FIGS. 2.4B and 2.4C show a comparison of spectra resulting from DMSP nanoESI-MS analysis of 1 µM cyt-c in 50 mM KCl with 1% AA conditioning solution (FIG. 2.4B) vs. 1% AA and 2% m-NBA (FIG. 2.45C) to highlight the significant effect addition of mNBA has on limit of detection. With 1% AA alone (FIG. 2.4B), no distinguishable (i.e. high SNR) protonated cyt-c peaks are visible, while treatment with 1% AA and 2% m-NBA produces five distinct peaks from completely protonated species (FIG. 2.4C). The concentration of cell quality indication (QCI) molecules may be even lower than those explored here. Therefore, the ability to detect low concentration biomolecules enabled by DMSP treatment is critical for MS application to cell manufacturing control, since a large range in signaling molecule concentrations is expected.

At moderate concentrations, i.e., 2.5 µM, where both conditioning solution compositions successfully reveal cyt-c, m-NBA enhances SNR across multiple charge states far above the levels obtained without m-NBA. With very high SNR peaks across a range of multiply charged states, identification of biomolecules is easier, and applications which can benefit from biomolecule structural information are enabled through the use of tandem (MS/MS) mass spectrometry that performs best with highly charged species.

Although for both 5.0 and 10.0 µM cyt-c concentrations, 1% AA treatment produces a very high SNR for the highest intensity peak, m-NBA treatment again creates higher average SNR values. These levels of cyt-c concentration (5, 10 µM) are very high, and approaching the point where signal saturation was observed. At these higher levels of cyt-c abundance, detection of the biomolecules is not dependent on treatment type, muting the impact of active sample conditioning. However, the ability to detect low concentration biomolecules (i.e. <2.5 µM cyt-c) through DMSP's active sample conditioning with m-NBA is the most important conclusion of these experiments. This means that DMSP has a compelling capability for discovery and/or detection of ultra-low concentration biomolecules because of active sample treatment via inline introduction of SNR enhancing compounds. This type of detection is usually only possible with offline methods like HPLC, rendering DMSP a unique and powerful tool for in operando cell-health monitoring.

Multicomponent Detection Enabled by DMSP

The ability to detect and differentiate between multiple biomolecules simultaneously will enable untargeted discovery, and is a desired feature enabling more robust control of bioreactor environment and utility for a diverse spectrum of cell types. To probe the DMSP capability of multiple protein detection, we performed experiments with a cell buffer mixture (1×phosphate-buffered saline, PBS) containing interleukin 6 (IL-6), interleukin 8 (IL-8), and cyt-c using two different "active" sample conditioning strategies previously described (FIGS. 2.5A-2.5C). With molecular weights of ~8 kDa (IL-8), ~12 kDa (cyt-C), and ~21 kDa (IL-6), the mixture of these molecules is a realistic proxy for cytokines, which are known to be indicative of cell health,[13, 14] in a solution that has multiple inorganic compounds (i.e. NaCl, KCl, $Na_2HPO_4$, and $KH_2PO_4$) in concentrations representative of a bioreactor environment.[36] These experiments again demonstrate the power of m-NBA treatment for detecting multiple analytes of interest from the complex bioreactor mixtures. Specifically, when 1% AA treatment was used alone, only IL-6 was detected (FIG. 2.5B), whereas addition 2% m-NBA to 1% AA in active sample conditioning yielded detection of both IL-6 and cyt-c (FIG. 2.5C). As expected, the baseline ESI-MS of 5 µM IL-6, IL-8, and cyt-c in 1×PBS without DMSP treatment produces no meaningful detection of either biomarker (FIG. 2.5A). This is another powerful demonstration of DMSP QCI detection capabilities under realistic conditions when inorganic compounds, which are abundantly present in cell bioreactors, can hinder the standard MS analysis of analytes by suppressing the relevant molecular signatures via competitive metal cation adduction and salt cluster formation, as well as raising the background noise in the spectra.

When 1% AA is used as the conditioning solution, removal of inorganic compounds and acidification of the sample in the DMSP reduces chemical noise associated with salt adducts and clusters, and IL-6 can be detected, although the protonated peaks are accompanied by metal cation adducts (FIG. 2.5B). The highest concentration of salt in PBS is NaCl at 137 mM, which is drastically higher than the salt levels explored in the experiments described prior (100 mM FIG. 2.3A-2.3E, 50 mM FIG. 2.4A-2.4C). Still, based on relative quantification experiments (not presented) it is likely the DMSP is removing over 99% of the salts present in order to reveal the signal associated with IL-6. However, the SNR is low and peaks formed via salt adducts are visible at higher m/z values along with each protonated peak, indicating opportunities for further improvements in mass exchange and resulting sample treatment.

When the conditioning solution contains both 1% AA and 2% m-NBA, high SNR peaks due to fully protonated cyt-C and IL-6 appear (FIG. 2.5C). However, even with this level of conditioning IL-8 is not detected. As the smallest of the analytes, at ~8 kDa, IL-8 may have suffered more parasitic loss in the DMSP mass exchanger than larger in size cyt-c and IL-6.[30] The addition of m-NBA to sample treatment shows how additives can further enhance the performance of DMSP so that it outperforms 1% AA treatment significantly. This result further emphasizes that m-NBA is not only an attractive treatment option for supercharging (i.e. shifting charge state distributions towards lower m/z range), but also is a very useful additive for reducing chemical noise due to metal cation adduction and salt cluster formation. These initial promising results demonstrate that DMSP, with active sample treatment, has an ability to monitor multiple biomolecules online in a high salt content mixture, essential for bioreactor monitoring.

DMSP Device Design for Improved ESI-MS Performance

DMSP Design Considerations for Improved Selectivity and Reduction of Response Time Important metrics for DMSP performance are analyte retention, sample residence time, salt removal, and active conditioner exchange effectiveness. Due to the nature of the separation technique, any molecule that is smaller than the pore diameter in the size selective nanoporous membrane will diffuse through and therefore be removed from, or, in the case of active conditioning, introduced into the sample. However, reducing the size of the pores in the membrane can increase molecular selectivity (i.e. larger biomolecules retained, smaller inorganic salts still removed from sample, FIG. 2.6A) at the cost of an increased resistance to mass transfer through the membrane (FIG. 2.6B). A moderate reduction in pore size only minimally affects the diffusion of small molecules, such as the inorganic salt molecules that are targeted for removal or conditioning agents introduced into the sample for ESI-MS enhancement. However, this reduction in pore size will enable a substantial reduction in the effective diffusion coefficient of larger biomolecules through the nanopores and thus an improved selectivity of separation resulting in higher QCI retention in the sample. FIG. 2.6A, which is based on predictions by Tibavinksy et. al.,[30] shows that with a reduction in membrane pore size the device will improve retention of larger biomolecules, such as albumin (~66 kDa), cytochrome-c (~12 kDa), and insulin (~6 kDa), while not affecting the diffusion of smaller molecules, such as salt ions. Pore size tuning can be achieved by changing the solution used for anodization and reducing the anodization voltage during fabrication of the membrane.[39] It should be noted that active conditioners used in these experiments are relatively small compared to the nanopores as well (e.g., m-NBA molecular weight ~150 Da), so their infusion to the sample channel will not be hindered. FIG. 2.6B shows that pore size cannot be reduced too far, because although the molecular weight cutoff decreases with pore size, the mass transfer resistance increases asymptotically as well, which will negatively impact the time response of DMSP by requiring a longer residence time for sufficient sample conditioning. Thus, an optimum pore size will exist between the two extremes, which will be explored as part of the proposed work.

Residence time within DMSP depends on the volume of the entire system, including the inlet capillary, microfabricated mass exchanger, and outlet ESI emitter. Currently, the microfabricated device has a volume of ~20 nL, and the inlet capillary and ESI emitter have dead volumes of ~700 and ~70 nL respectively. Changing the design of the mass exchanger to minimize dead volume also affects the mass transfer efficiency, however reducing the diameter of the inlet and outlet capillaries can significantly decrease sample residence time with no effect on mass transfer (aside from sample dispersion considerations). Therefore, reducing the inlet/outlet capillaries' volume will have the greatest effect on DMSP response time. When incorporated with a sampling interface, the minimization of connecting fluidic paths will again be of critical importance compared to further minimization of the microfabricated DMSP. However, with extremely small capillary connections to and from the DMSP mass exchanger higher probability of clogging and increased flow resistances may lead to membrane failure (membrane rupture at ~800 kPa[30]) and decreased device robustness. This trade-off will be empirically explored through multiple design variations around the baseline informed by scaling predictions from the first-principle mass transfer and fluid flow analysis.

DMSP Mass Transfer Enhancement

In the preliminary experiments, residual salt content and a parasitic loss of the smallest biomolecule to the conditioner channel resulted in an incomplete identification of all three biomolecules in solution (FIGS. 2.5A-2.5C). With active conditioning, particularly using supercharging molecule m-NBA as an active conditioner, the device was shown to be more effective at identifying low concentration biomolecules in high salt content solutions, but the presence of salt adducts in 1% AA treatment (FIG. 2.5B) and the identification of only two of the three biomolecules in multicomponent analysis (FIG. 2.5C) motivate a need to enhance the selective removal of salts and increase the infusion of sample modifiers from the active sample conditioner.

The total rate of mass transfer (directly related to device effectiveness, i.e. percent of salt removed) within the microfabricated exchanger can be analyzed from a mass transfer resistance approach (FIG. 2.7), considering the resistance associated with the sample channel, membrane, and conditioning channel separately. These three resistances are in series, and by knowing the concentration of any molecule in the sample channel and the conditioning channel the rate of mass transfer can be calculated (FIG. 2.7).

In the sample channel, an assumption is made that the mass transfer by convection dominates, since the Peclet number is high enough that diffusion along the sample flow path is not significant compared to advective transport. In the size selective membrane separating the sample channel and active conditioner channel, due to low "cross-over" flow rates through the nanopores (low Peclet number) owing to high hydraulic resistance and smaller cross-membrane pressure difference, only diffusion is considered. In the active sample conditioner channel convective mass transfer is again the dominating effect. These resistances for a similar mass exchanger design and component dimensions[30] are shown to be 1) $R_{sample}=1/h_{sample} \approx 1100$ s/m 2) $R_{membrane}=\delta_m/\phi D \approx 10000$ s/m and 3) $R_{condition}=1/h_{condition} \approx 36000$ s/m, where $h_{sample}$ and $h_{conditioner}$ are the convective mass transfer coefficients in respective channel, $\delta_m$ is the membrane thickness, $\phi$ is the membrane porosity, and D is the effective diffusion coefficient across the membrane nanopores. The two dominating resistances are in the membrane and conditioner channel, which will be the focus of DMSP design and geometry optimization in the proposed work.

Residence time, $t_{res}=V/\dot{Q}$, in DMSP is a function of the dead volume (V) and flow rate ($\dot{Q}$). The device effectiveness depends on the resistance to mass transfer in the device and the sample residence time, which is inversely proportional to the flow rate during sample treatment. With a fixed mass transfer resistance, lower flow rates result in a more complete removal of all species (including analytes), while too high of a flow rate through DMSP leads to the partial retention of parasitic compounds in the sample channel A reduction in mass transfer resistance (assuming a fixed dead volume) allows for a decrease in sample residence time, since compounds are removed at higher rates, allowing for the device to be operated at increased flow rates. In FIG. 9 the relationship between mass transfer resistance and residence time is shown. Improvements for all three individual resistances need to be made to minimize the total resistance, but there are operational tradeoffs that provide constraints on the practical sizes of the membrane thickness and the sample channel geometry. That is for a fixed nanopore diameter, the mass transfer resistance for membrane can be reduced by thinning the membrane thus minimizing the transport length through the pores. However, the reduction in thickness must be balanced with the membrane structural integrity such that it can withstand the pressure differential across it based on the hydrodynamic conditions in the sample and the conditioning flow channel There is an optimal thickness that ensures the fastest transport across the membrane while maintaining robust operation over the range of target flow rates.

In the sample channel, due to a simple rectangular geometry and fully developed flow, the Sherwood number correlation (as a function of the Reynolds and Schmidt numbers) can be used to estimate the mass transfer coefficient. The mass transfer coefficient scales with the inverse of sample channel height. Thus, it is desirable to minimize the channel height under the constraint of a limit on the maximum pressure developed in the sample channel. This pressure should be low enough to maintain structural stability of the transfer membrane, and to ensure an ability to pump fluid through the device. This pressure drop is highly sensitive to changes in the sample channel height, as it scales with the inverse of the channel hydraulic diameter to the fourth power for a constant volumetric flow rate. Further consideration constraining the minimum channel size is a requirement for reduced incidence of clogging. In the current design, the height of the channel is kept at 5 μm chosen based on ease of fabrication and empirical observations of providing sufficiently low mass transfer resistance while avoiding clogs.

In the conditioner channel, due to a complex geometry and a developing mass transfer boundary layer, computational fluid dynamics (CFD) simulations need to be used to estimate the convective mass transfer coefficient, which is spatially varying along the flow direction. We propose to use a simulation guided approach to identify the optimal flow configuration (e.g. parallel/counter-flow as in the current design vs. cross-flow or serpentine flow pattern for the conditioning fluid) and geometry (e.g., height reduction to reduce mass transfer while increasing the channel width to accommodate higher flow rates without excessive pressure drop) for the conditioner channel. This will yield the lowest, but still practically realizable, mass transfer resistance, resulting in greater salt removal and more effective (greater flux) injection of active compounds into a sample for conditioning. Since the sample conditioning channel is currently the component with the highest mass transfer resistance (FIG. 2.8), significant improvements in DMSP performance could be expected through first-principle analysis and optimization of convective mass transfer in the conditioning flow.

Tuning of Chemistry for Active Sample Conditioning

In the preliminary work active sample conditioning composition was limited to only two chemicals in solution at one time (e.g. acetic acid and m-NBA) using a relatively small set of chemical additives (acetic acid, ammonium acetate, m-NBA, and methanol) in concentrations based on values found throughout literature. Chemical compounds which either denature or supercharge biomolecules were shown to be beneficial, but applying these effects in different combinations, and to mixtures containing several target biomolecules with different properties (hydrophobic vs hydrophilic) and molecular weights using DMSP's active sample conditioning has yet to be fully explored. Additionally, m-NBA and methanol are of limited use in this system, but for different reasons. In water, m-NBA was observed to be insoluble at levels above 2% by volume, which puts a limit on the amount of m-NBA that can be introduced to the sample to enhance ESI-MS by supercharging; other chemicals that are more soluble in water can transfer faster and in greater amounts into the sample channel due to an increased concentration difference, and hence a greater flux (FIG. 2.7). This motivates exploration of higher solubility (and higher diffusivity) compounds endowed with supercharging properties (e.g., propylene carbonate, ethylene carbonate, sulofane) for improving the performance (SNR and LOD) of DMSP across a broad range of target analytes. Methanol was also shown to shift charge states by denaturing the proteins (allowing for more protonation sites), but a decreased solubility of inorganic salts in methanol led to salt precipitation and eventual clogging of the DMSP. Exploration of other organic solvents for sample modification will elucidate how different denaturing solvents, such as acetonitrile, with higher salt solubility to avoid precipitation and clogging, will impact of DMSP ESI-MS sensitivity. The mass transfer analysis described in the previous section will be used to guide the concentrations and types of molecules used for these active sample conditioning studies.

Combining more than two active conditioning compounds for dynamic sample modification in the microfluidic sample treatment channel will also yield novel results, potentially exploiting multiple benefits of each conditioner, leading to a significant improvement in DMSP performance. These studies will be exploratory in nature, and may or may not yield the desired benefits of improved analytical sensitivity (SNR and LOD) while maintaining robust operation. Collectively, a fundamental understanding of mass transfer effects in a microfabricated mass exchanger through analysis, simulations, and experimental investigation of different chemistries for sample treatment will yield new insight on operating modes and design criteria for online ESI-MS analysis from complex chemical environments.

Dynamic Sampling Interface (DSI) for DMSP Integration with Bioreactors

Secreted biomolecules from cells growing within a bioreactor can be correlated to cell health, propagation, and differentiation.[2, 11-14, 23] As cells secrete, the released biomolecules rapidly become less concentrated as they diffuse away from the cell membrane. As a result, static, bulk sampling away from the cells will uptake the target biomolecules at significantly reduced concentrations due to volumetric dilution and time averaging. Further, the presence of high abundance molecules such as growth factors in cell serum provide an overwhelming background for ESI-MS detection of low abundance secreted target analytes. Therefore, spatially and temporally resolved sampling is essential for high sensitivity monitoring of cell secretomes to enable: 1) the mitigation of spatial dilution and time averaging of secreted biomolecules by analyzing the secretome in the immediate vicinity of cells or cell carriers; 2) the capability for capturing the transient cell secretion events since online sample treatment by DMSP affords a nearly real-time ESI-MS analysis; and 3) the probing of spatial heterogeneity of secretomes within the bioreactor environment in correlation with the spatial distribution of 2D and 3D cell cultures.

The chemically complex environment within a cell-bioreactor is not amenable to direct ESI-MS analysis without sample preparation. Vitamins, electrolytes, glucose and other high concentration biomolecules, such as growth factors, found in serum contribute to the degradation of MS signal due to charge scavenging, chemical noise, and convolution of MS spectral features, thus making molecular identification and quantification of low abundance signaling molecules (cytokines, metabolites, etc.) indicative of cell health challenging. Salts and other small dissociated molecules create adducts (proteins charged via metal cation addition) during the electrospray process, which suppress the signal of fully protonated ions (i.e. charged via protons) and complicate the charge state distribution in the MS spectra, which is critical for molecular identification. As described above, DMSP showed an ability to detect multiple biomolecules, in the mass range similar to expected signaling molecules, within chemically complex, high salt content mixtures via active sample conditioning for online ESI-MS analysis. Incorporation of a localized sampling interface coupled to DMSP will create a tool capable of monitoring, transiently, the secretion of low concentration biomolecules to understand how the biomolecular composition changes throughout the bioreactor volume, which can be correlated with functional assays for cell viability and potency. FIGS. 2.9A-2.9B depict the key components of the Dynamic Sampling Interface (DSI) for integration of DMSP with a cell-bioreactor. These include 1) a pump for bi-directional sample uptake/infusion (e.g. syringe pump), 2) a switching valve for control of the flow direction during uptake and infusion, 3) a flexible capillary terminated with a small size orifice to capture small volumes of the reactor content locally, e.g. near cells for probing the secretomes; and 4) capillary connection to DMSP and MS for online analysis. During sample uptake, the flow rate can be tuned to match the rate and duration of the chemical secretion of the cells, thus capturing transient events in the reactor. On the other hand, during infusion, the flow rate should be tuned for matching an optimal flow rate required by DMSP for desalting and active sample conditioning and subsequent ESI-MS analysis, which requires a certain flow rate to maintain stable nanoESI for a given spray capillary dimensions. In FIG. 10 the difference in pressure between ports A and B illustrates how in sample uptake (FIG. 2.9A) the flow can dynamically change to capture the secretion dynamics using small extracted liquid volumes, whereas during infusion (FIG. 2.9B) the pumping pressure difference is constant for sustaining an optimal, steady flow rate during DMSP infusion to ESI-MS.

The implementation of DSI is not only a novel technological development, but also a scientifically interesting problem with fluid dynamics and mass transfer considerations playing a critical role in design. The sampling interface should be able to uptake volumes as small as necessary to capture the molecular release during the localized cell secretion event, which is expected to be in the nanoliter range. However, the dead volume of the DMSP is well above this level, not even counting for tubing and valve dead volumes. Thus, if sampling is performed into an empty system, the sampled volume would have to be at least as large as the dead volume to avoid the introduction of air bubbles (which would interfere with DMSP functionality). Therefore the entire sampling interface/DMSP dead volume should be initially filled with a non-interfering liquid prior to sampling from the bioreactor to enable only a small volume sample is extracted, without the introduction of air bubbles into the system.

As a small sample is taken up into the system, a liquid "plug" will flow through the piping and valves of the sampling interface (FIG. 2.10A). Since the liquids are expected to be miscible, dispersion of the sampled liquid plug will dilute the sample as it advances through the sampling interface and to the outlet/inlet to DMSP. According to Taylor's dispersion theory,[40, 41] lower flow rates and smaller capillary volumes will result in reduced dispersion effects, but since velocity, transit time, and volume are related to dispersion phenomenon, the optimal design requires careful optimization, balancing the reduction in the device response time with improved sensitivity that comes with less dispersed sample. Another consideration is that as flow rates become lower, axial diffusion will become significant as Peclet number approaches unity. Application of mass transfer theory will assess these trade-offs quantitatively, which can be validated using benchmark elution experiments (via optical or MS sensing). This approach will enable an optimal design and operation of the dynamic sampling interface (DSI) in conjunction with DMSP and MS, yielding the highest sensitivity and fastest response for bioreactor monitoring (FIG. 2.10B). Sample dilution depends on flow rate (Q), diffusion coefficient (D), volume (V). Dispersion theory (Taylor, 1953) governs high Peclet number flow:

$$D_{eff} = D_{AB}\left(1 + \frac{Pe^2}{48}\right)$$

$$C_{mean} \alpha \left(\frac{V}{Q}\right) D_{eff}$$

Online Sampling from Cell Bioreactor

During the engineering optimization of the sampling interface (DSI) and the DMSP mass exchanger for high sensitivity and high spatial/temporal resolution, DMSP is concurrently characterized for the monitoring of bioreactor environments. Due to the untargeted approach of ESI-MS, DMSP analysis of a bioreactor has the unique potential to reveal the local biochemistry of cell growth and help identify the biomarkers that can be correlated with the cell culture state under different growth conditions. Many of these findings are difficult to anticipate at this stage, as the current level of understanding of bioreactor environments is limited to offline assays (e.g., Luminex) of bulk samples extracted at a few time points over the course of long (1-2 weeks) cell growth periods. By sampling at multiple locations throughout the bioreactor volume, it is expected that spatial heterogeneities in biochemical composition can be uncovered using DMSP, along with identification of previously unknown dynamic changes in the cell secretome.

The ability for DMSP to sample, treat, and analyze via ESI-MS rapidly will provide insight to the timescales of cell-bioreactor events. DMSP will elucidate on what time scale biochemicals vary within the volume, and therefore establish minimum analysis time scale for adequate monitoring of dynamic cell behavior. For instance, if biochemical composition varies at rates much slower than expected, a new design of the DMSP sampling interface and mass exchanger can tune future online measurement for different modes of analysis, e.g. optimizing the system for longer sample retention (and hence reduced transient sensitivity) with increased sample selectivity, as well as introducing additional analyte pre-concentration and/or size-selective filtering steps to better monitor these bioreactors.

DMSP analysis can also probe how different operating conditions affect the biochemical composition in the bioreactor, thus enabling the hypothesis generation on cell growth behavior mapped onto its secretome evolution. One question of significant interest and significant practical importance is how serum free media affects growing cells. DMSP's capability to monitor the cell secretome locally in response to a change in serum may provide important clues relevant to serum utility in therapeutic cell manufacturing. Other factors that might affect the monitored molecules in a bioreactor include the physical design (e.g spinning flask vs. rocking plate), cell type, microcarrier concentration, media agitation rate, etc., which would provide compelling avenues for future studies once the DMSP and the DSI are fully developed in the course of this dissertation research. The ability for DMSP to easily probe a variety of operating conditions in therapeutic cell manufacturing is a high impact outcome of this work.

FIG. 2.11 shows DMSP application to three cell types grown in media containing FBS. Each sample was gathered at 40 uL/hr and infused through DMSP at 26 uL/hr with active sample treatment using 1% m-NBA 1% AA. As shown in previous results, this mixture enabled significant improvements in limit of detection, and also the ability to detect multiple biomolecules simultaneously. Importantly, these results show that DMSP is capable of sampling a very small volume (2 uL) and detecting differences between three cell types.

FIG. 2.12 shows the capability of DMSP to exploit localized sampling to detect low concentration biomarkers secreted by cells. In cell cultures, secreted molecules are in highest concentration near where the cells are growing (i.e. the cell membrane), and therefore standard methods such as HPLC and enzymatic assays capture bulk samples of secreted molecules in low concentration. By sampling near the cells, the local concentration is drastically increased. The four spectra represent signal gathered from the same cell culture of human fibroblasts cells, which is captured by direct ESI-MS analysis through DMSP. The first the third spectra labeled "near" are spectra resulting from 2 uL of media extracted from near the cells and treated with 1% AA 1% m-NBA via active sample conditioning in DMSP. The second and fourth spectra, labeled "far" are from 2 uL sampled in the bulk media, again treated with 1% AA 1% m-NBA. The difference between localized and bulk sampling demonstrates the powerful effect that DMSP will have on detection of important biomarkers in cell cultures. The results in FIGS. 2.11 and 2.12 show that DMSP has already demonstrated the ability to monitor differences between different cell types, as well as the ability to rapidly and repeatedly sample from cell cultures to detect biomolecules. The enhanced spatial and temporal resolution provided by DMSP will provide new discovery and quality control capabilities in cell manufacturing.

EXAMPLE 1 REFERENCES

1. Kaiser, A. D., et al., *Towards a commercial process for the manufacture of genetically modified T cells for therapy.* Cancer Gene Therapy, 2015. 22: p. 72.

2. Maude, S. L., et al., *CD19-targeted chimeric antigen receptor T-cell therapy for acute lymphoblastic leukemia*. Blood, 2015. 125(26): p. 4017.
3. Oettgen, P., *Cardiac Stem Cell Therapy*. Circulation, 2006. 114(4): p. 353.
4. Poulos, J., *The limited application of stem cells in medicine: a review*. Stem Cell Research & Therapy, 2018. 9(1): p. 1.
5. Kropp, C., D. Massai, and R. Zweigerdt, *Progress and challenges in large-scale expansion of human pluripotent stem cells*. Process Biochemistry, 2017. 59: p. 244-254.
6. Simaria Ana, S., et al., *Allogeneic cell therapy bioprocess economics and optimization: Single-use cell expansion technologies*. Biotechnology and Bioengineering, 2013. 111(1): p. 69-83.
7. Iyer Nisha, R., S. Wilems Thomas, and E. Sakiyama-Elbert Shelly, *Stem cells for spinal cord injury: Strategies to inform differentiation and transplantation*. Biotechnology and Bioengineering, 2016. 114(2): p. 245-259.
8. De Sousa, P. A., et al., *Development and production of good manufacturing practice grade human embryonic stem cell lines as source material for clinical application*. Stem Cell Research, 2016. 17(2): p. 379-390.
9. Lipsitz, Y. Y., N. E. Timmins, and P. W. Zandstra, *Quality cell therapy manufacturing by design*. Nature Biotechnology, 2016. 34: p. 393.
10. du Moulin Gary, C., et al., *A 3-year experience of quality control and quality assurance in the multisite delivery of a lymphocyte-based cellular therapy for renal cell carcinoma*. Biotechnology and Bioengineering, 1994. 43(8): p. 693-699.
11. Mucida, D., et al., *Reciprocal T$_H$17 and Regulatory T Cell Differentiation Mediated by Retinoic Acid*. Science, 2007. 317(5835): p. 256.
12. Agarwal, S. and A. Rao, *Modulation of Chromatin Structure Regulates Cytokine Gene Expression during T Cell Differentiation*. Immunity, 1998. 9(6): p. 765-775.
13. Lai, Y., A. Asthana, and W. S. Kisaalita, *Biomarkers for simplifying HTS 3D cell culture platforms for drug discovery: the case for cytokines*. Drug Discovery Today, 2011. 16(7): p. 293-297.
14. Coronel, A., et al., *Cytokine production and T-cell activation by macrophage-dendritic cells generated for therapeutic use*. British Journal of Haematology, 2001. 114(3): p. 671-680.
15. Albrecht, S., et al., *Proteomics in biomanufacturing control: Protein dynamics of CHO-K1 cells and conditioned media during apoptosis and necrosis*. Biotechnology and Bioengineering, 2018. 115(6): p. 1509-1520.
16. Zhao, L., et al., *Advances in process monitoring tools for cell culture bioprocesses*. Engineering in Life Sciences, 2015. 15(5): p. 459-468.
17. Odeleye Akinlolu Oyekunle, O., et al., *Development of an optical system for the non-invasive tracking of stem cell growth on microcarriers*. Biotechnology and Bioengineering, 2017. 114(9): p. 2032-2042.
18. Rice, W. L., D. L. Kaplan, and I. Georgakoudi, *Two-Photon Microscopy for Non-Invasive, Quantitative Monitoring of Stem Cell Differentiation*. PLOS ONE, 2010. 5(4): p. e10075.
19. Teixeira, A. P., et al., *Advances in on-line monitoring and control of mammalian cell cultures: Supporting the PAT initiative*. Biotechnology Advances, 2009. 27(6): p. 726-732.
20. Wang, M., et al., *Microarray-based gene expression analysis as a process characterization tool to establish comparability of complex biological products: Scale-up of a whole-cell immunotherapy product*. Biotechnology and Bioengineering, 2009. 104(4): p. 796-808.
21. Kirouac, D. C. and P. W. Zandstra, *The Systematic Production of Cells for Cell Therapies*. Cell Stem Cell, 2008. 3(4): p. 369-381.
22. Fenn, J. B., et al., *ELECTROSPRAY IONIZATION FOR MASS-SPECTROMETRY OF LARGE BIOMOLECULES*. Science, 1989. 246(4926): p. 64-71.
23. Vaughn Cecily, P., et al., *Identification of proteins released by follicular lymphoma-derived cells using a mass spectrometry-based approach*. PROTEOMICS, 2006. 6(10): p. 3223-3230.
24. Jon Rowley, E. A., Andrew Campbell, Harvey Brandwein, Steve Oh, *Meeting Lot-Size Challenges of Manufacturing Adherent Cells for Therapy*. BioProcess Int, 2012. 10: p. 16-22.
25. Nampe, D., et al., *Impact of fluidic agitation on human pluripotent stem cells in stirred suspension culture*. Biotechnology and Bioengineering, 2017. 114(9): p. 2109-2120.
26. Rodrigues, C. A. V., et al., *Stem cell cultivation in bioreactors*. Biotechnology Advances, 2011. 29(6): p. 815-829.
27. Cech, N. B. and C. G. Enke, *Practical implications of some recent studies in electrospray ionization fundamentals*. Mass Spectrom Rev, 2001. 20(6): p. 362-87.
28. Lomeli, S. H., et al., *New Reagents for Increasing ESI Multiple Charging of Proteins and Protein Complexes*. Journal of the American Society for Mass Spectrometry, 2010. 21(1): p. 127.
29. Nemani, K. V., et al., *In vitro and in vivo evaluation of SU-8 biocompatibility*. Mater Sci Eng C Mater Biol Appl, 2013. 33(7): p. 4453-9.
30. Tibavinsky, I. A., P. A. Kottke, and A. G. Fedorov, *Microfabricated Ultrarapid Desalting Device for Nanoelectrospray Ionization Mass Spectrometry*. Analytical Chemistry, 2015. 87(1): p. 351-356.
31. Konerman, L., *Addressing a Common Misconception: Ammonium Acetate as Neutral pH "Buffer" for Native Electrospray Mass Spectrometry*. Journal of The American Society for Mass Spectrometry, 2017. 28(9): p. 1827-1835.
32. Abbassi-Ghadi, N., et al., *A Comparison of DESI-MS and LC-MS for the Lipidomic Profiling of Human Cancer Tissue*. Journal of The American Society for Mass Spectrometry, 2016. 27(2): p. 255-264.
33. Rush Michael, D. and B. Breemen Richard, *Role of ammonium in the ionization of phosphatidylcholines during electrospray mass spectrometry*. Rapid Communications in Mass Spectrometry, 2016. 31(3): p. 264-268.
34. Cassou, C. A. and E. R. Williams, *Desalting protein ions in native mass spectrometry using supercharging reagents*. Analyst, 2014. 139(19): p. 4810-4819.
35. Iavarone, A. T. and E. R. Williams, *Mechanism of Charging and Supercharging Molecules in Electrospray Ionization*. Journal of the American Chemical Society, 2003. 125(8): p. 2319-2327.
36. Stubblefield, E. and G. C. Mueller, *Effects of Sodium Chloride Concentration on Growth, Biochemical Composition*, and Metabolism of HeLa Cells. Cancer Research, 1960. 20(11): p. 1646-1655.
37. Pinho, S. P. and E. A. Macedo, *Solubility of NaCl, NaBr, and KCl in Water, Methanol, Ethanol, and Their Mixed Solvents*. Journal of Chemical & Engineering Data, 2005. 50(1): p. 29-32.

38. Iavarone, A. T. and E. R. Williams, *Supercharging in electrospray ionization: effects on signal and charge.* International Journal of Mass Spectrometry, 2002. 219(1): p. 63-72.
39. Zhang, F., et al., *Nano porous anodic aluminium oxide membranes with 6-19 nm pore diameters formed by a low potential anodizing process.* Nanotechnology, 2007. 18(34): p. 345302.
40. *Dispersion of soluble matter in solvent flowing slowly through a tube.* Proceedings of the Royal Society of London. Series A. Mathematical and Physical Sciences, 1953. 219(1137): p. 186.
41. Kirby, B. J., *Micro-and nanoscale fluid mechanics: transport in microfluidic devices.* 2010: Cambridge university press.

Example 2

Introduction

The Dynamic Sampling Platform with nano-electrospray ionization mass spectrometry (DSP-nanoESI-MS, or DSP) is a device for the discovery and monitoring of quality attribute (QAs) biomolecules (e.g. metabolites, proteins) secreted by therapeutic cells during their production. The device samples cell media directly from the bioreactor and rapidly conditions the sample for inline, real-time MS analysis (~1 minute). The DSP is combined with a spatially resolved sampling interface that provides non-invasive, sterile, and highly localized sampling from near the cell membrane to capture transient cell processes and to sample the highest concentration of secreted biomolecules. The DSP-nanoESI-MS technology, coupled with the novel sampling interface, has been applied to multiple live cell cultures throughout the entire growth cycle (~3 weeks) without interfering with the cell growth trajectory. The recent results demonstrate an ability to continuously sample from live cell cultures (MC3T3), provide MS "fingerprints" of cell state, and to exploit localized sampling with real-time MS analysis to detect differences in cells at different stages of cell growth (i.e. undifferentiated & differentiated cells). These results show that the technology does not interfere with cell culture sterility or affect cell growth processes, and importantly the device can enable the real-time detection of secreted biochemicals that traditional on-line analytics do not detect.

Approaches/Methods:

DSP-nanoESI-MS is microfabricated in a cleanroom environment with fully monolithic component integration to enable continuous collection, treatment, and direct infusion of ultra-small bioreactors samples for dynamic electrospray ionization mass spectrometry (ESI-MS) detection of cell secretome. DSP-nanoESI-MS is comprised of three elements: 1) a non-invasive sampling interface, which has demonstrated the ability to continuously sample from 2D cell cultures without breaking sterility; 2) a microfabricated mass exchanger for sample treatment which simultaneously removes compounds not amenable to MS analysis, such as inorganic salts, and introduces compounds that enhance MS limit of detection; and, 3) an outlet for direct nanoESI-MS analysis, providing unambiguous identification/fingerprinting of biomolecules in cell cultures.

Results:

Recently published results have demonstrated that DSP is capable of identifying multiple relevant biomarkers in a chemically complex mixtures which served as a proxy to cell culture media.[1] The results of these experiments directed the optimization of DSP flow configurations to enhance sample treatment effectiveness as well as sensitivity to low concentration biomolecules. With the pilot study complete, initial studies on both 2D and 3D cell cultures began.

DSP has been applied to 2D (adherent) cell cultures to show that the technology is capable of differentiating between three adherent cell types grown in media with FBS serum (human umbilical vein endothelial cells, human mesenchymal stromal cells, and normal human lung fibroblasts). Results indicate that DSP is able to distinguish the secretome signature locally (i.e. near cells) vs bulk (from the media) for adherent fibroblast cells (unpublished data). Incorporation of DSP into 3D cell cultures (MSC cells grown on microcarriers in spinning flask) has been demonstrated.

To understand the capability to detect differences between clinically relevant cell groups, DSP was applied to MC3T3 cells. Two groups of cells, one given differentiation media and one control, were monitored over 18 days of cell growth. DSP measurements of both cell cultures were taken every 3 days, with both local and bulk samples taken in triplicate at each time point. Principal component analysis was carried out to identify differences between groups and revealed that localized sampling was critical to detecting differences between undifferentiated and differentiated cell groups. An osteoblast cell group (MC3T3) was selected for the pilot study due to the well characterized differences in secretome for undifferentiated and differentiated cell groups, as well as the robust nature of the cell line.[2-4] The cells were divided into two groups for study. One group was given differentiation media, and the other given the control media used during initial cell expansion so that one cell line remained in an undifferentiated state throughout the entire study while the other progressed from an undifferentiated to a differentiated state. The cells were then analyzed every 3 days using DSP coupled to direct nanoESI-MS analysis.

During sampling, a hot plate set to maintain the temperature of the cells at 37 C was placed under the 6-well plate to mitigate risk of cell death. All sampling tubing (360 um OD, 50 um ID, PEEK) was autoclaved at 100 C for 1 hour and kept in sterile packaging until sampling. A new tube was used every time to sample from the cell culture, with purging using sterile water carried out between each sample on the same cell culture. To allow contaminant free sampling, a sterile hypodermic needle was used to puncture the aluminum foil, allowing for easy access of the PEEK tube into the cell culture. Immediately after sampling, the cells were brought back to the cell culture lab and the media was changed per protocol. During sampling, triplicate samples of 1 uL were taken from the bulk media above the cells and from a local region ~50 um from the cell surface, as confirmed by a digital microscope angled horizontally into the 2D cell culture. This sample was routed directly through the DSP mass exchanger, where it was treated with 1% m-NBA and 1% AA in the conditioning channel (as per prior experiments). This resulted in six MS spectra for each cell group at each time point. In total, six time points were captured, resulting in a grand total of 72 spectra (36 bulk, 36 local) for the cell groups, which enables robust statistical analysis and drawing meaningful conclusions from the data.

FIG. 3.1 shows representative spectra from the last time point collected. The top six spectra correspond to three bulk/local samples from undifferentiated cells (normal media), and the bottom 6 correspond to bulk/local samples from differentiated cells (differentiation media). Although the two groups were established to be different through an assay to confirm differentiation, visually the spectra do not appear to have any striking differences, except for the top spectra which is likely a technical outlier due to issues getting the DSP system set up initially. Statistical analysis in the form of principal component analysis (PCA) was carried out to identify differences in the spectra. This analysis technique can reveal differences between the spectra that correspond to candidate molecules or to increases/decreases in spectral intensities that correspond to cell state, i.e. "fingerprinting" the cells. For PCA analysis, a free software called "MultiMS-toolbox" was utilized.[5]

Prior to PCA analysis, data was extracted from the Bruker software using ProteoWizard™ and then converted to the appropriate file format (mzML) for PCA analysis. Filtering was carried out on the raw data including baseline subtraction and peak smoothing. The signal to noise ratio threshold of data was set to 0.5, and a Savitzky-Golay smoothing method was used to smooth noise that can distort the shape of the spectrum and skew final results. In order to maintain fidelity, PCA was run on the entire spectrum and then winnowed down according to raw loadings plots. The range of m/z values with the highest contribution to variance was chosen as the reduced window size. Without winnowing, the large amount of low intensity "noise" at the higher end of the spectra masked the contribution of important features in the lower mass ranges.

For the first PCA comparison, spectra from time points 5 and 6 were considered as one "group" for both the differentiated and undifferentiated cells for the first analysis. This analysis revealed that localized sampling results in clustering of cells in a differentiated and undifferentiated state. The cells in each culture are secreting different molecules, and these molecules are at the highest concentration near the cells themselves. Therefore, localized sampling captures a richer biochemical signal than bulk sampling does. FIGS. 3.2A-3.2B show the PCA plots for the undifferentiated vs differentiated cells. If the bulk data (FIG. 3.2A) are analyzed, no separation is evident between the groups. However, if only the localized sampling (FIG. 3.2B) is taken into consideration, separation and clustering between the groups is observed, indicating that DSP is capable of detecting the differences between these differentiated and undifferentiated cell groups.

A second analysis was carried out on the differentiated cell line only. Although every sample was taken from the same cell culture, time points 1 and 2 were grouped together to represent "undifferentiated" cells while time points 5 and 6 were grouped together to represent "differentiated cells". FIGS. 3.3A-3.3B show the PCA plots, again revealing that localized sampling (FIG. 3.3B) is the only method revealing strong clusters, confirming that this method of sampling enhances the ability of DSP to detect differences between cell groups.

The DSP is able to exploit localized sampling, inline "active" sample treatment, and direct ESI-MS analysis to detect differences between cells in undifferentiated and differentiated states. Offline analysis is under way (via HPLC-MS/MS) to help identify candidate molecules contributing most to the differences in the cell groups. Coupled with a mass spectrometer capable of tandem mass spectrometry for MS/MS identification of CQAs, DSP will serve as a discovery tool to identify potential quality attribute molecules indicating cell state, and to then monitor these molecules online to control the trajectory of cells during growth and differentiation. Ultimately, the new quality control capabilities afforded by DSP will enable the scale-up and scale-out of cell manufacturing.

When DSP is used in conjunction with a bioreactor at a GMP facility, sampled and ionized analyte from the cell culture needs to be transferred to the mass spectrometer. The ion transfer capillary allows for the transfer of ions long distances with minimal loss to the inlet of a mass spectrometer.[6] The concept has been adapted for use with the mass spectrometer in the lab and is shown in FIG. 3.4. Ions generated by ESI are transferred to the MS inlet via vacuum drawn on a box surrounding the MS front end. The transfer tube and the vacuum tube are fed into a polycarbonate box via feedthrough pipe fittings. Both tubes are made of Tygon tubing, which does not interfere with MS analysis. A custom extended MS inlet extends within the ion transfer tube to increase the transfer efficiency of the system.

To test whether or not ions were efficiently transferred in this set-up, 5 uM cytochrome-c with 1% AA was introduced to the ion transfer tube which was approximately 0.5 meters long. Without vacuum turned on, no MS signal was observed. However, with vacuum on, the cytochrome-C signal was completely recovered, as shown in FIG. 3.5 which shows direct infusion (top) versus ion transfer system (bottom). These results demonstrate that DSP can be placed in close proximity to where the cells are being grown, carry out analysis, and then transfer the analyte to the mass spectrometer via ion transfer capabilities without sacrificing sensitivity to low concentration molecules.

EXAMPLE 2 REFERENCES

1. Chilmonczyk, M., et al., *Dynamic Mass Spectrometry Probe (DMSP) for ESI-MS Monitoring of Bioreactors for Therapeutic Cell Manufacturing.* Biotechnology and bioengineering, 2018.
2. Murgia, A., et al., *Potency biomarker signature genes from multiparametric osteogenesis assays: will cGMP human bone marrow mesenchymal stromal cells make bone?* PloS one, 2016. 11(10): p. e0163629.
3. Siegel, G., et al., *Phenotype, donor age and gender affect function of human bone marrow-derived mesenchymal stromal cells.* BMC medicine, 2013. 11(1): p. 146.
4. Galipeau, J., et al., *International Society for Cellular Therapy perspective on immune functional assays for mesenchymal stromal cells as potency release criterion for advanced phase clinical trials.* Cytotherapy, 2016. 18(2): p. 151-159.
5. Cejnar, P., et al., *Principal component analysis of normalized full spectrum mass spectrometry data in multiMS-toolbox: An effective tool to identify important factors for classification of different metabolic patterns and bacterial strains.* Rapid Communications in Mass Spectrometry, 2018. 32(11): p. 871-881.
6. Garimella, S., et al., *Gas-flow assisted ion transfer for mass spectrometry.* Journal of Mass Spectrometry, 2012. 47(2): p. 201-207.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system comprising:
a flow system including a pump system and a valve system, wherein the pump system and the valve system are in fluidic communication;
a sampling system in fluidic communication with the flow system;
a reactor comprising a fluid, wherein the sampling system is in fluidic communication with the reactor, wherein in a first configuration of the flow system, the fluid sample is flowed from the reactor to the pump system through the valve system at a first flow rate; and
a sensor system in fluidic communication with the flow system, wherein in a second configuration of the valve system the fluid sample is flowed from the pump system to the sensor system at a second flow rate, wherein the sensor system is configured to analyze the fluid sample,
wherein the sample system comprises an extraction element that is dimensionally configured to extract the fluid sample comprising secretome, metabolome, transcriptome, genome, lipidome, or combinations thereof and excluding an intact cell, a microcarrier including one or more intact cells, or combinations thereof.

2. The system of claim 1, further comprising a feedback control system configured to use the output of the sensor system to modify conditions of the reactor, wherein the system is a closed-loop feedback system.

3. The system of claim 1, wherein the first flow rate and the second flow rate are different.

4. The system of claim 1, wherein the sampling system is configured to sequentially or simultaneously obtain fluid samples from one or more regions of the reactor in the x-, y-, and z-axis.

5. A system comprising:
a flow system including a pump system and a valve system, wherein the pump system and the valve system are in fluidic communication;
a sampling system in fluidic communication with the flow system;
a reactor comprising a fluid, wherein the sampling system is in fluidic communication with the reactor, wherein in a first configuration of the flow system the fluid sample is flowed from the reactor to the pump system through the valve system at a first flow rate; and
a sensor system in fluidic communication with the flow system, wherein in a second configuration of the valve system the fluid sample is flowed from the pump system to the sensor system at a second flow rate, wherein the sensor system is configured to analyze the fluid sample wherein the sampling system comprises an extraction element that is dimensionally configured to extract the fluid sample comprising a microcarrier including one or more intact cells, wherein the extraction element is further dimensionally configured to trap the microcarrier.

6. A system comprising:
a flow system including a pump system and a valve system, wherein the pump system and the valve system are in fluidic communication;
a sampling system in fluidic communication with the flow system;
a reactor comprising a fluid, wherein the sampling system is in fluidic communication with the reactor, wherein in a first configuration of the flow system the fluid sample is flowed from the reactor to the pump system through the valve system at a first flow rate; and
a sensor system in fluidic communication with the flow system, wherein in a second configuration of the valve system the fluid sample is flowed from the pump system to the sensor system at a second flow rate, wherein the sensor system is configured to analyze the fluid sample, further comprising a separation/fractionation/trapping system in fluidic communication with the flow system and the sampling system, wherein the separation/fractionation/trapping system is configured to separate a first group of components from the fluid sample to produce a separated/fractionated fluid sample, wherein the separated/fractionated fluid sample is analyzed by the sensor system.

7. The system of claim 6, wherein the sampling system comprises an extraction element that is dimensionally configured to extract the fluid sample comprising secretome, metabolome, transcriptome, genome, lipidome, or combinations thereof and excluding an intact cell, a microcarrier including one or more intact cells, or combinations thereof.

8. A system comprising:
a flow system including a pump system and a valve system, wherein the pump system and the valve system are in fluidic communication;
a sampling system in fluidic communication with the flow system;
a reactor comprising a fluid, wherein the sampling system is in fluidic communication with the reactor, wherein in a first configuration of the flow system the fluid sample is flowed from the reactor to the pump system through the valve system at a first flow rate; and
a sensor system in fluidic communication with the flow system, wherein in a second configuration of the valve system the fluid sample is flowed from the pump system to the sensor system at a second flow rate, wherein the sensor system is configured to analyze the fluid sample, further comprising a separation system in fluidic communication with the flow system and the sensor system, wherein the separation system is configured to separate a first group of components from the fluid sample to produce a separated fluid sample, wherein the separated fluid sample is analyzed by the sensor system.

9. A system comprising:
a flow system including a pump system and a valve system, wherein the pump system and the valve system are in fluidic communication;
a sampling system in fluidic communication with the flow system;
a reactor comprising a fluid, wherein the sampling system is in fluidic communication with the reactor, wherein in a first configuration of the flow system the fluid sample is flowed from the reactor to the pump system through the valve system at a first flow rate; and
a sensor system in fluidic communication with the flow system, wherein in a second configuration of the valve system the fluid sample is flowed from the pump system to the sensor system at a second flow rate, wherein the sensor system is configured to analyze the fluid sample, further comprising a mass exchanger in fluidic communication with the flow system and the sampling system, wherein the mass exchanger is configured to condition the fluid sample to produce a conditioned fluid sample for analysis by the sensor system, wherein the conditioned fluid sample is flowed through the mass exchanger.

10. A system comprising:
a flow system including a pump system and a valve system, wherein the pump system and the valve system are in fluidic communication;
a sampling system in fluidic communication with the flow system;
a reactor comprising a fluid, wherein the sampling system is in fluidic communication with the reactor, wherein in a first configuration of the flow system the fluid sample is flowed from the reactor to the pump system through the valve system at a first flow rate; and
a sensor system in fluidic communication with the flow system, wherein in a second configuration of the valve system the fluid sample is flowed from the pump system to the sensor system at a second flow rate, wherein the sensor system is configured to analyze the fluid sample, further comprising a mass exchanger in fluidic communication with the flow system and the sensor system, wherein the mass exchanger is configured to condition the fluid sample to produce a conditioned fluid sample for analysis by the sensor system or a mass exchanger in fluidic communication with the flow system and the separation system, wherein the mass exchanger is configured to condition the separated fluid sample to produce a conditioned fluid sample for analysis by the sensor system or a mass exchanger in fluidic communication with the separation system and the sensor system, wherein the mass exchanger is configured to condition the separated fluid sample to produce a conditioned fluid sample for analysis by the sensor system or all of these.

11. The system of claim 10, wherein the mass exchanger includes a first flow channel having a first flow channel entrance and a first flow channel exit, and a second flow channel having a second flow channel entrance and a second flow channel exit, where the first flow channel and the second flow channel are separated from one another by a selectively permeable membrane.

12. The system of claim 11, wherein the mass exchanger is configured to flow the fluid sample through the first flow channel from the first flow channel entrance to the first flow channel exit and be in fluid communication with the selectively permeable membrane, wherein the mass exchanger is configured to flow a conditioning fluid through the second flow channel from the second flow channel entrance and the second flow channel exit and be in fluid communication with the selectively permeable membrane, wherein the sample fluid and the conditioning fluid are in communication through the selectively permeable membrane.

13. The system of claim 12, wherein the mass exchanger configured to lyse includes electroporation, chemical digestion, mechanoporation, sonoporation, and thermoporation, osmotic stressing, or a combination thereof.

14. The system of claim 13, wherein the mass exchanger is configured so that the sample fluid is converted to a conditioned fluid sample through interaction of the sample fluid with the conditioning fluid(s), the selectively permeable membrane(s), or a combination thereof, wherein the sensor system analyzes the conditioned fluid sample.

15. The system of claim 12, wherein the sensor system comprises one or more identical or distinct sensing devices.

16. The system of claim 15, wherein the sensor system is configured to operate so that the fluid sample is analyzed in parallel by two or more sensing devices or wherein the sensor system is configured to operation so that the fluid sample is analyzed serially by two or more sensing devices.

17. The system of claim 15, wherein the sensor system comprises a sensing device selected from: ESI-MS, Raman Spectrometer, FTIR Spectrometer, UV-VIS Spectrometer, ESEM/SEM, Optical Microscope, Fluorescence Microscope, NMR, Electrochemical Redox and/or Impedance Sensor, Flow Cytometer, and Acoustic Transducer.

18. The system of claim 11, wherein the mass exchanger including the first flow channel having the first flow channel entrance and the first flow channel exit, wherein the first flow channel further comprises a trapping chamber, wherein the trapping chamber is dimensionally configured to trap one or more microcarriers or cells, wherein the first flow channel is configured to lyse the cells of the microcarriers or the cells, wherein the components of cytoplasm are the sample fluid and flow through the first flow channel and are in fluidic communication with the selectively permeable membrane.

19. The system of claim 10, wherein the mass exchanger includes a first flow channel having a first flow channel entrance and a first flow channel exit, a second flow channel having a second flow channel entrance and a second flow channel exit, and a third flow channel having a third flow channel entrance and a third flow channel exit, where the first flow channel and the second flow channel are separated from one another by a first selectively permeable membrane, and where the third flow channel and the second flow channel are separated from one another by a second selectively permeable membrane, wherein the mass exchanger is configured to flow the fluid sample through the second channel, wherein the mass exchanger is configured to flow a first conditioning fluid through the first flow channel, wherein the mass exchanger is configured to flow a second conditioning fluid through the third flow channel.

* * * * *